(12) United States Patent
Jung et al.

(10) Patent No.: US 12,062,755 B2
(45) Date of Patent: Aug. 13, 2024

(54) COMPOSITE SOLID ELECTROLYTE, METHOD OF PREPARING THE SAME, AND ELECTROCHEMICAL DEVICE INCLUDING THE SAME

(71) Applicant: Samsung Electronics Co., Ltd., Suwon-si (KR)

(72) Inventors: Sungkyun Jung, Suwon-si (KR); Hyeokjo Gwon, Hwaseong-si (KR); Gabin Yoon, Seoul (KR); Lincoln Miara, Burlington, MA (US); Valentina Lacivita, Mountain View, CA (US); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 17/397,004

(22) Filed: Aug. 9, 2021

(65) Prior Publication Data

US 2022/0231325 A1   Jul. 21, 2022

Related U.S. Application Data

(60) Provisional application No. 63/137,806, filed on Jan. 15, 2021.

(30) Foreign Application Priority Data

Mar. 18, 2021   (KR) ........................ 10-2021-0035346

(51) Int. Cl.
*H01M 10/0562*   (2010.01)
*H01M 4/04*   (2006.01)
(Continued)

(52) U.S. Cl.
CPC ..... *H01M 10/0562* (2013.01); *H01M 4/0407* (2013.01); *H01M 4/382* (2013.01);
(Continued)

(58) Field of Classification Search
CPC ... H01M 2300/008; H01M 2300/0034; H01M 2300/0065–0082; H01M 10/0562;
(Continued)

(56) References Cited

U.S. PATENT DOCUMENTS 5,273,846 A   12/1993   Plichta et al.
10,566,611 B2   2/2020   Allie et al.
(Continued)

FOREIGN PATENT DOCUMENTS

KR   1020180046574 A   5/2018
KR   1020180095681 A   8/2018
(Continued)

OTHER PUBLICATIONS

Han et al., "Interphase Engineering Enabled All-Ceramic Lithium Battery," Joule, 2, 2018, p. 497-508. (Year: 2018).*
(Continued)

*Primary Examiner* — Mayla Gonzalez Ramos
*Assistant Examiner* — Bethany C Garcia
(74) *Attorney, Agent, or Firm* — CANTOR COLBURN LLP

(57) ABSTRACT

A composite solid electrolyte including a first solid electrolyte layer including a halide solid electrolyte, a second solid electrolyte layer including an oxide solid electrolyte, a lithium ion-conductive interlayer between the first solid electrolyte layer and the second solid electrolyte layer, wherein the lithium ion-conductive interlayer includes a composition in which a reaction energy of the lithium
(Continued)

ion-conductive interlayer with respect to the first solid electrolyte is −50 meV/atom or greater.

29 Claims, 30 Drawing Sheets

(51) Int. Cl.
*H01M 4/38* (2006.01)
*H01M 10/052* (2010.01)

(52) U.S. Cl.
CPC .. *H01M 10/052* (2013.01); *H01M 2300/0071* (2013.01); *H01M 2300/008* (2013.01)

(58) Field of Classification Search
CPC ......... H01M 6/18–187; H01M 50/426; H01M 10/052; H01M 10/0525; H01M 10/058; H01M 10/0585; H01M 10/0565; H01M 10/056; H01M 10/054; H01M 10/4235; H01M 10/44; H01M 10/48; H01M 10/654; H01M 4/382; H01M 4/0407; H01M 4/62; H01M 4/134; H01M 4/1395; H01M 4/366; H01M 4/38; H01M 4/625; H01M 4/043; H01M 4/0471; H01M 4/13; H01M 4/131; H01M 4/139; H01M 4/381; H01M 4/386; H01M 4/525; H01M 4/0421; H01M 4/0426; H01M 4/0447; H01M 4/0497; H01M 4/362; H01M 4/387; H01M 4/405; H01M 4/485; H01M 4/505; H01M 4/622–624; H01M 4/626; H01M 4/628; H01M 2300/0094; H01M 2300/002; H01M 2300/0088; H01M 2004/027; H01M 2004/028; H01M 50/431–434; H01M 50/44; H01M 50/497; H01M 50/46; H01M 50/449; H01M 50/437; H01M 50/457; H01M 50/489; H01M 50/491; H01M 6/185; H01M 6/188; H01M 6/182; Y02E 60/10; Y02P 70/50; H01B 1/06; H01B 1/10; H01B 1/122; H01B 1/22; H01B 13/00; C01F 17/36; C01B 25/14; C01B 17/22; C03C 4/14; C03C 17/245; C03C 2217/214; C03C 2217/22; C03C 2217/24; C03C 3/064; C03C 3/11; C03C 3/323; C03C 3/325; C01D 15/00; C01D 15/04; C01G 15/00; C01G 49/009; C01G 25/006; C01P 2006/40; Y10T 29/49108; Y10T 29/49115; Y02T 10/70

See application file for complete search history.

(56) References Cited

U.S. PATENT DOCUMENTS

| | | | |
|---|---|---|---|
| 2020/0075993 A1* | 3/2020 | Ling | H01M 4/582 |
| 2020/0161710 A1* | 5/2020 | Watanabe | H01M 4/382 |
| 2020/0328465 A1 | 10/2020 | Sakaida et al. | |
| 2020/0350627 A1* | 11/2020 | Sugimoto | H01M 10/0525 |
| 2021/0376378 A1 | 12/2021 | Jung et al. | |

FOREIGN PATENT DOCUMENTS

| | | |
|---|---|---|
| KR | 1020200096342 A | 8/2020 |
| KR | 1020210149619 A | 12/2021 |

OTHER PUBLICATIONS

Sun et al., "Facilitating Interfacial Stability via Bilayer Heterostructure Solid Electrolyte Toward High-energy, Safe and Adaptable Lithium Batteries", Advanced Energy Materials, 10, 2020, pp. 2000709 (11 pages).

Yu et al., "Insights into a layered hybrid solid electrolyte and its application in long lifespan high-voltage all-solid-state lithium batteries", Journal of Materials Chemistry A, 7, 2019, pp. 3882.

* cited by examiner

COMPOSITE SOLID ELECTROLYTE, METHOD OF PREPARING THE SAME, AND ELECTROCHEMICAL DEVICE INCLUDING THE SAME

CROSS-REFERENCE TO RELATED APPLICATIONS

This application is based on and claims priority to U.S. Patent Application Ser. No. 63/137,806, filed on Jan. 15, 2021, in the US Patent and Trademark Office, and Korean Patent Application No. 10-2021-0035346, filed on Mar. 18, 2021, in the Korean Intellectual Property Office, and all the benefits accruing therefrom under 35 U.S.C. § 119, the content of which are incorporated by reference herein in their entirety.

BACKGROUND

1. Field

The present disclosure relates to a solid electrolyte, a method of preparing the same, and an electrochemical device including the same.

2. Description of the Related Art

A solid secondary battery includes a cathode, a solid electrolyte, and an anode, among which the solid electrolyte is desired to have high ionic conductivity.

As the solid electrolyte, a sulfide-based solid electrolyte or an oxide-based solid electrolyte is used. In order to use such a solid electrolyte in a solid secondary battery, it is preferred to minimize a grain boundary between crystal particles in the solid electrolyte.

When a sulfide-based solid electrolyte is used as the solid electrolyte, a cell may be manufactured through pressurization, but toxic sulfide gas may be generated upon exposure to air. Therefore, in order to manufacture a solid secondary battery having excellent safety, the development of an oxide-based solid secondary battery that is stable in the air is desired. However, when an oxide-based solid electrolyte is used, due to the hard physical properties of the oxide-based solid electrolyte, uneven interfacial adhesion can occur between the cathode and the solid electrolyte. Thus there remains a need for an improved solid electrolyte

SUMMARY

Provided is a novel composite solid electrolyte and methods of preparing the same.

Provided is an electrochemical device including the solid electrolyte.

Provided is an electrochemical cell including the solid electrolyte.

Additional aspects will be set forth in part in the description which follows and, in part, will be apparent from the description.

According to an aspect, provided is a composite solid electrolyte including a first solid electrolyte layer comprising a halide solid electrolyte, a second solid electrolyte layer comprising an oxide solid electrolyte; and a lithium ion-conductive interlayer between the first solid electrolyte layer and the second solid electrolyte layer, wherein the lithium ion-conductive interlayer includes a composition in which a reaction energy of the lithium ion-conductive interlayer with respect to the first solid electrolyte is −50 meV/atom or greater.

According to another aspect, provided is an electrochemical device including the composite solid electrolyte.

According to another aspect, provided is an electrochemical cell including the composite solid electrolyte.

According to another aspect, provided is a method of preparing a composite solid electrolyte, the method including providing a first solid electrolyte layer; providing a second solid electrolyte layer; disposing on the second solid electrolyte layer a lithium ion-conductive interlayer, and disposing on the lithium ion-conductive interlayer the first solid electrolyte layer to prepare a composite solid electrolyte, wherein the first solid electrolyte comprises a halide solid electrolyte, wherein the second solid electrolyte comprises an oxide solid electrolyte, wherein the disposing of the lithium ion-conductive interlayer includes coating a lithium ion-conductive interlayer precursor on the second solid electrolyte, and heat treating the lithium ion-conductive interlayer precursor to form the lithium ion-conductive interlayer, or coating the lithium ion-conductive interlayer precursor on a substrate, and heat treating the lithium ion-conductive interlayer precursor to prepare the lithium ion-conductive interlayer, separating the lithium ion-conductive interlayer from the substrate, and stacking the separated lithium ion-conductive interlayer on the second solid electrolyte.

Also disclosed is a method of manufacturing an electrochemical cell, the method including: providing a cathode; providing an anode; and disposing the composite solid electrolyte of claim 1 between the cathode and the anode to manufacture the electrochemical cell.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
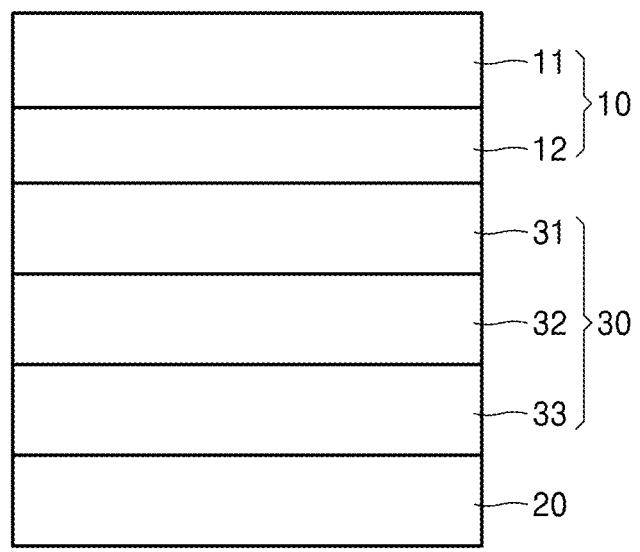
FIG. 1 is a schematic view showing a structure of an embodiment of an electrochemical cell including a composite solid electrolyte.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a composite solid electrolyte, a method of preparing the same, and an electrochemical device and an electrochemical cell, each including the composite solid electrolyte, will be described in greater detail.

A composite solid electrolyte according to an embodiment comprises: a first solid electrolyte layer comprising a halide solid electrolyte; a second solid electrolyte layer comprising an oxide-based solid electrolyte, and a lithium ion-conductive interlayer between the first solid electrolyte layer and the second solid electrolyte layer, wherein the lithium ion-conductive interlayer comprises a composition in which a reaction energy of the lithium ion-conductive interlayer with respect to the first solid electrolyte, i.e., the first solid electrolyte layer, is −50 millielectron-volts per atom (meV/atom) or greater.

In order to manufacture a solid secondary battery with good safety, development of a solid secondary battery employing an oxide-based solid electrolyte that is stable in the air is desired. However, because the oxide-based solid electrolyte has hard physical properties, the cathode and the oxide solid electrolyte may contact unevenly at the interface. In order to solve the uneven contact between the cathode and the oxide-based solid electrolyte, high-temperature sintering of the cathode and the oxide-based solid electrolyte has been proposed. However, even when the high-temperature sintering process is performed, characteristics of the solid secondary battery are unsatisfactory, and thus, further improvement is desired.

In addition to the high-temperature sintering process, a method of forming a halide solid electrolyte between the oxide-based solid electrolyte and the cathode has been proposed.

However, when the halide solid electrolyte is used, halide ions and/or metal ions of the halide solid electrolyte permeate into the oxide-based solid electrolyte, and thus, the lifespan characteristics of the battery may deteriorate.

The present inventors have solved the problems described above and provide a composite solid electrolyte in which, a lithium ion-conductive interlayer is provided between the halide solid electrolyte and the oxide-based solid electrolyte. The lithium ion-conductive interlayer has excellent stability against the halide solid electrolyte and the oxide-based solid electrolyte. Here, the halide solid electrolyte is a solid electrolyte with excellent formability. Also, the halide solid electrolyte can be provided without use of high-pressure, unlike sulfide-based solid electrolytes.

The lithium ion-conductive interlayer includes a composition in which a reaction energy of the lithium ion-conductive interlayer, with respect to the first solid electrolyte layer, is about −50 millielectron volts per atom (meV/atom) or greater.

The reaction energy is about −40 meV/atom or greater, for example, about −41 meV/atom to 0 meV/atom, about −35 meV/atom to about −5 meV/atom, or about −30 meV/atom to about −10 meV/atom, which is greater than that between the first solid electrolyte and the second solid electrolyte, and thus, lithium ion-conductive interlayer may effectively inhibit reaction of the first solid electrolyte with the second solid electrolyte.

When the reaction energy of the composition in the lithium ion-conductive interlayer with respect to the first solid electrolyte is less than −50 meV/atom, the lithium ion-conductive interlayer may have reactivity to the halide solid electrolyte, which is the first solid electrolyte, and thus, the permeation of halide anions and metal cations of the halide solid electrolyte into the second solid electrolyte may not be effectively inhibited.

The reaction energy (E1) of the lithium ion-conductive interlayer to the first solid electrolyte is represented as Equation 1, and the reaction energy (E2) of the lithium ion-conductive interlayer to the second solid electrolyte is represented as Equation 2, as further disclosed in ACS Appl. Mater. Interfaces 2020, 12, 60076014, the content of which is incorporated herein by reference in its entirety.

$E1$=(Thermodynamic energy of reaction product of the first solid electrolyte and the interlayer)−(Thermodynamic energy of the first solid electrolyte (reaction product 1)+Thermodynamic energy of the interlayer (reaction product 2))  Equation 1

$E2$=(Thermodynamic energy of reaction product of the second solid electrolyte and the interlayer)−(Thermodynamic energy of the second solid electrolyte (reaction product 3)+Thermodynamic energy of the interlayer (reaction product 2))  Equation 2

The reaction energy between the first solid electrolyte and the second solid electrolyte is represented as Equation 3, and is, for example, about −130 meV/atom to about −300 meV/atom.

$E3$=(Thermodynamic energy of reaction product of the first solid electrolyte and the second solid electrolyte)−(Thermodynamic energy of reaction product of the first solid electrolyte (reaction product 1)+Thermodynamic energy of the second solid electrolyte (reaction product 3))  Equation 3

In Equations 1 to 3, the thermodynamic energy of the first solid electrolyte (reaction product 1), the thermodynamic energy of the lithium ion-conductive interlayer (reaction product 2), and the thermodynamic energy of the second solid electrolyte (reaction product 3) are values obtained through density functional theory (DFT) calculation with the Vienna ab initio simulation package (VASP) program. In Equations 1 and 2, the interlayer refers to the lithium ion-conductive interlayer.

The term "thermodynamic energy" is used herein to mean the same as "thermodynamic formation energy." The thermodynamic energies of the first solid electrolyte, the lithium ion-conductive interlayer, and the second solid electrolyte refer to the thermodynamic formation energies of materials forming the first solid electrolyte, the lithium ion-conductive interlayer, and the second solid electrolyte, respectively.

The reaction energy of the lithium ion-conductive interlayer to the first solid electrolyte, the reaction energy of the lithium ion-conductive interlayer to the second solid electrolyte, and the reaction energy between the first solid electrolyte and the second solid electrolyte may be determined by comparison of the thermodynamic stabilities of the lithium ion-conductive interlayer, the first solid electrolyte and the second solid electrolyte through calculation using DFT with the VASP. For example, $3LiCl-GaF_3$ may be used as the first solid electrolyte, and $Li_{6.5}La_3Zr_{1.5}Ta_{0.5}O_{12}$ (LLZO) may be used as the second solid electrolyte.

The ionic conductivity at room temperature (25° C.) of the lithium ion-conductive interlayer is about $10^{-3}$ millisiemens per centimeter (mS/cm) or greater, for example, about $2 \cdot 10^{-3}$ mS/cm to about $8 \cdot 10^{-3}$ mS/cm, about $3 \cdot 10^{-3}$ mS/cm to about $7 \cdot 10^{-3}$ mS/cm, or about $4 \cdot 10^{-3}$ mS/cm to about $6 \cdot 10^{-3}$ mS/cm. When the ionic conductivity of the lithium ion-conductive interlayer is within these ranges, an electrochemical device and an electrochemical cell that includes the composite solid electrolyte containing the lithium ion-conductive interlayer may have reduced internal resistance.

The composition contained in the lithium ion-conductive interlayer may contain at least one lithium ion-conductive compound.

The lithium ion-conductive compound includes, for example, $Li_{2+x}C_{1-x}B_xO_3$ (wherein $0<x<1$), $LiF$, $Li_2SO_4$, $Li_3AsO_4$, $Li_2CO_3$, $Li_3PO_4$, $LiPO_4$, $LiCl$, $Li_4VO_4F$, $Li_3VO_4$, lithium metaborate, lithium orthoborate, lithium tetraborate, lithium phosphorous oxynitride (LiPON), lithium fluoride-doped lithium metaborate, silicon-doped lithium tetraborate, lithium metaborate-doped lithium carbonate ($LiBO_2$—$Li_2CO_3$), lithium orthoborate-doped lithium carbonate ($Li_3BO_3$—$Li_2CO_3$), lithium carbonate-doped lithium orthoborate ($Li_2CO_3$—$Li_3BO_3$), silicon dioxide-doped $Li_3BO_3$—$Li_2CO_3$ ($SiO_2$—$Li_3BO_3$—$Li_2CO_3$), lithium fluoride-doped $Li_3BO_3$—$Li_2CO_3$(LiF—$Li_3BO_3$—$Li_2CO_3$), or a combination thereof.

The lithium ion-conductive interlayer may comprise a lithium oxide comprising boron, carbon, or a combination thereof. In the formula $Li_{2+x}C_{1-x}B_xO_3$ (wherein 0<x<1), x is, for example, about 0.1 to about 0.95, about 0.1 to about 0.9, about 0.1 to about 0.8, about 0.1 to about 0.7, about 0.2 to about 0.5, or about 0.25 to about 0.375.

In an embodiment, the lithium ion-conductive interlayer includes a lithium oxide containing at least one of boron and carbon. The lithium oxide may have a low melting point, e.g., about 300° C. to about 850° C., for example, about 400° C. to about 700° C., and thus has excellent adhesion and is suitable to form a low impedance interface with excellent adhesion to the first solid electrolyte and the second solid electrolyte. The lithium ion-conductive interlayer may contain, for example, $Li_{2+x}C_{1-x}B_xO_3$ (wherein 0<x<1). The $Li_{2+x}C_{1-x}B_xO_3$ (wherein 0<x<1) may have the same crystal structure as that of $Li_2CO_3$.

In the formula $Li_{2+x}C_{1-x}B_xO_3$ (wherein 0<x<1), x is, for example, about 0.01 to about 0.99, about 0.1 to about 0.9, about 0.2 to about 0.8, about 0.3 to about 0.7, or about 0.4 to about 0.6.

The lithium ion-conductive interlayer includes, for example, $Li_{2.1}C_{0.9}B_{0.1}O_3$, $Li_{2.15}C_{0.85}B_{0.15}O_3$, $Li_{2.175}C_{0.825}B_{0.175}O_3$, $Li_{2.2}C_{0.8}B_{0.2}O_3$, $Li_{2.5}C_{0.75}B_{0.25}O_3$, $Li_{2.275}C_{0.725}B_{0.275}O_3$, $Li_{2.3}C_{0.7}B_{0.3}O_3$, $Li_{2.5}C_{0.65}B_{0.35}O_3$, $Li_{2.375}C_{0.625}B_{0.375}O_3$, $Li_{2.4}C_{0.6}B_{0.4}O_3$, $Li_{2.45}C_{0.55}B_{0.45}O_3$, $Li_{2.475}C_{0.525}B_{0.475}O_3$, $Li_{2.5}C_{0.5}B_{0.5}O_3$, $Li_{2.55}C_{0.45}B_{0.55}O_3$, $Li_{2.575}C_{0.425}B_{0.575}O_3$, or a combination thereof.

The thickness of the lithium ion-conductive interlayer is, although not specifically limited, for example, about 1 micrometer (μm) to about 10 μm, about 1 μm to about 9 μm, about 2 μm to about 9 μm, about 2 μm to 8 μm, or about 2 μm to about 5 μm. When the thickness of the lithium ion-conductive interlayer is within these ranges, side reactions of the halide solid electrolyte with the oxide-based solid electrolyte are effectively inhibited, and thus, an electrochemical cell with improved lifespan characteristics may be manufactured.

The lithium ion-conductive interlayer may include a compound that exhibits a peak at a diffraction angle of about 21°2θ to about 22°2θ, about 23°2θ to about 24°2θ, about 29.5°2θ to about 30°2θ, about 30.5°2θ to about 31°2θ, about 31.5°2θ to about 32°2θ, about 34°2θ to about 34.5°2θ, about 36°2θ, about 37°2θ, and/or about 39°2θ to about 40°2θ, when analyzed by X-ray diffraction (XRD) analysis with Cu Kα radiation. In an aspect, the lithium ion-conductive interlayer may include a compound that exhibits peaks at each diffraction angle of about 21°2θ to about 22°2θ, about 23°2θ to about 24°2θ, about 29.5°2θ to about 30°2θ, about 30.5°2θ to about 31°2θ, about 31.5°2θ to about 32°2θ, about 34°2θ to about 34.5°2θ, about 36°2θ, about 37°2θ, and about 39°2θ to about 40°2θ, when analyzed by X-ray diffraction (XRD) analysis with Cu Kα radiation.

In an embodiment, the lithium ion-conductive interlayer may further include an additional lithium ion-conductive compound.

In the composite solid electrolyte according to an embodiment, the first solid electrolyte layer comprises the halide solid electrolyte, and the halide solid electrolyte comprises a compound represented by Formula 1. The compound represented by Formula 1 is a solid electrolyte having a glass or glass-ceramic structure. The halide solid electrolyte is a halogen containing solid electrolyte that can be provided without use of high-pressure, unlike a sulfide-based solid electrolyte, and has excellent formability.

When the halide solid electrolyte is used to manufacture a battery, highly uniform interfacial characteristics between the solid electrolyte and a cathode may be ensured.

$ALi_qQ_{1-q}X$—$Ga_{1-z}M_zF_{3-3z}Z_{3z}$            Formula 1

In Formula 1, Q is Na K, or a combination thereof,

M is a trivalent cationic element, or a combination thereof,

X is a halogen element other than fluorine (F), a pseudohalogen, or a combination thereof, Z is a monovalent anionic element or a combination thereof, 1<A<5, 0<q≤1, and 0≤z<1.

As used herein, "glass" refers to an amorphous material exhibiting a glass transition phenomenon, "glass-ceramic" refers to a material in which glass, or glass-like material, and including at least one crystalline component, and in which two components as a glass phase (glass phase or amorphous phase) and a crystalline phase are observed.

The halide solid electrolyte exhibits a glass transition phenomenon and has a glass transition temperature that is less than a battery operation temperature. Thus, facilitating forming the solid electrolyte in a desired shape.

The compound of Formula 1 is identified as having a glass transition phenomenon through scanning electron microscopy (SEM) analysis. The compound of Formula 1 has a glass transition temperature of about −40° C. or less, about −50° C. or less, for example, about −40° C. to about −100° C., about −50° C. to about −90° C., or about −60° C. to about −70° C.

The compound of Formula 1 may comprise gallium (Ga), fluorine (F), and X, and thus, contains heterogeneous halogens.

In Formula 1, M is a cationic element with an oxidation number of +3, and may be, for example, In, Sc, Al, Tl, Y, B, La, or a combination thereof, and Z may be a halogen element, a pseudohalogen, or a combination thereof. The term "oxidation number" as used herein may refer to an average oxidation number.

The term "pseudohalogen" as used herein is a molecule that includes two or more electronegative atoms, resembles halogens in a free state, and is an anion similar to halide ions. Examples of pseudohalogens are cyanide (CN), cyanate (OCN), thiocyanate (SCN), azide ($N_3$), OH, or a combination thereof.

A moisture content of the first solid electrolyte may be about 5 weight percent (wt %) or less, for example, about 0.1 wt % to about 5 wt %, on the basis of the total weight of the first solid electrolyte. The term "moisture content" as used herein refers to the moisture present inside and/or on the surface of the first solid electrolyte.

A solid electrolyte is sensitive to moisture, so the adsorbed moisture may be decomposed to generate a large amount of gas, which can degrade the battery. For this reason, it is can be desirable to reduce the moisture content in the solid electrolyte.

However, in addition to when the moisture content is 0, when the moisture content is greater than 0 to about 5 wt % or less, the first solid electrolyte may maintain clay characteristics with excellent conductivity.

The moisture content of the first solid electrolyte is, on the basis of the total weight of the solid electrolyte, about 0.1 wt % to about 5 wt %, about 0.5 wt % to about 5 wt %, for example, about 1 wt % to about 2 wt % or less, for example, about 1.5 wt % to about 1.8 wt %. The moisture content of the first solid electrolyte may be determined using a thermogravimetric method.

The thermogravimetry is performed in air, e.g., with a TA instruments SDT-Q600 thermogravimetric analyzer. The thermogravimetric analysis may be measured in air from 100° C. to 900° C. at a heating/cooling rate of 2° C. per minute, and the moisture content of the first solid electrolyte may be determined from weight loss around 100° C.

In an embodiment, the moisture content of the first solid electrolyte may vary according to the moisture content of a starting material for forming a solid electrolyte including the compound of Formula 1, i.e., the moisture content of LiX and QX, if present, in: i) a mixture of LiX, QX (if present), and $M_zZ_{3z}$; ii) a mixture of LiX, QX (if present), $M_zZ_{3z}$, and $Ga_{1-z}F_{3-3z}$; or iii) a mixture of LiX, QX (if present), and $M_zZ_{3z}Ga_{1-z}F_{3-3z}$.

  Formula 1

In Formula 1, Q is Na, K, or a combination thereof,
M is a trivalent cationic element, or a combination thereof,
X is a halogen element other than fluorine (F), a pseudohalogen, or a combination thereof,
Z is a monovalent anionic element or a combination thereof,
$1<A<5$, $0<q\leq1$, and $0\leq z<1$.

LiX may be LiCl. The moisture content of the LiX and QX, if present, may be about 5 wt % or less, for example, 0 wt % or about 0.5 wt % to about 5 wt %, for example, about 1 wt % to about 4 wt %, for example, about 2 wt % to about 3.5 wt %, based on a total weight of the LiX and QX.

To obtain Li and QX having moisture content of about 5 wt % or less, a heat treatment process may be further performed at about 100° C. to about 190° C., about 130° C. to about 185° C., for example, about 140° C. to about 180° C. Through this heat treatment process, the moisture content of LiX and QX may be reduced. The heat treatment time varies according to heat treatment temperature, and may be performed, for example, for about 1 hour to about 20 hours, about 2 hours to about 18 hours, about 2 hours to about 15 hours, about 3 hours to about 14 hours, or about 5 hours to about 13 hours.

In the first solid electrolyte according to an embodiment, the compound of Formula 1 may have a hydrate form by forming a complex with water.

In an embodiment of the first solid electrolyte, moisture may be present in a form adsorbed onto the surface of the solid electrolyte.

In an embodiment of the first solid electrolyte, moisture may be present in a form adsorbed onto the surface of the solid electrolyte and also be contained in the solid electrolyte.

In an embodiment of the solid electrolyte, the moisture content is highest on the surface thereof and gradually is less in a direction towards the inside of the solid electrolyte.

In Formula 1, X is Cl, Br, I, or a combination thereof, and Z is Cl, Br, I, SCN, OCN, CN, OH, $N_3$, or a combination thereof.

When, in Formula 1, Q is Na, K, or a combination thereof, and a mole fraction (1−q) of the Na or K, may be about 0.1 to about 0.9, about 0.1 to about 0.6, for example, about 0.1 to about 0.5. Here, the total mole fraction of Li and the Na or K is 1.

In Formula 1, Q may be Na.

The compound of Formula 1 may include a compound represented by Formula 2.

  Formula 2

In Formula 2, M is a trivalent cationic element, or a combination thereof,
X is a halogen element other than fluorine (F), or a combination thereof,
Z is a monovalent anionic element, or a combination thereof,
$1<A<5$, and $0\leq z<1$.

The compound of Formula 1 may be a compound represented by Formula 3.

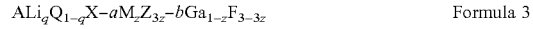  Formula 3

In Formula 3, Q is Na, K, or a combination thereof,
M is a trivalent cationic element, or a combination thereof,
X is a halogen element other than fluorine (F), or a combination thereof,
Z is a monovalent anionic element, or a combination thereof,
$0<a\leq1$, $0<b\leq1$, $0<a+b$, $a+b=4-A$, $1<Z\leq3$, $0<q\leq1$, and $0\leq z<1$, excluding the case where a and b are both 1, i.e., with the proviso that a and b are not both 1 at the same time.

In an embodiment, the compound of Formula 3 may include a compound represented by Formula 4.

  Formula 4

In Formula 4, M is a trivalent cationic element, or a combination thereof,
X is a halogen element other than fluorine (F), or a combination thereof,
Z is a monovalent anionic element, or a combination thereof,
$0<a\leq1$, $0<b\leq1$, $0<a+b$, $a+b=4-A$, $1<A\leq3$, and $0\leq z<1$, excluding the case where a and b are both 1, i.e., with the proviso that a and b are not both 1 at the same time.

In an embodiment, the ionic conductivity at room temperature (25° C.) of the first solid electrolyte is about 0.1 millisiemens per centimeter (mS/cm) or more, about 0.3 mS/cm or more, about 1 mS/cm or more, about 2 mS/cm or more, or about 3 mS/cm or more. In an embodiment, the ionic conductivity at room temperature (25° C.) of the first solid electrolyte is about 0.2 mS/cm to about 4 mS/cm, about 2 mS/cm to about 3.5 mS/cm, for example, about 3.2 mS/cm to about 3.4 mS/cm. As the first solid electrolyte has high ionic conductivity, the internal resistance of an electrochemical cell provided with the composite solid electrolyte including the first solid electrolyte may be further reduced.

The first solid electrolyte may have an activation energy of about 200 millielectron-volts (meV) to about 500 meV at room temperature (25° C.).

The compound of Formula 1 may be, for example, a compound of Formulae 5 to 7.

  Formula 5

In Formula 5, A is 2, 3, or 4.

  Formula 6

In Formula 6, A is 2, 3, or 4.

  Formula 7

In Formula 7, A is 2 or 3,

Z is Cl or OH,

M is La, In, Sc, Al, Tl, Y, B, La, or a combination thereof, $0<a<1$, $0<b<1$, $0<a+b$, $a+b=4-A$, and $0<z<1$.

The compound of Formula 1 is, for example, 2LiCl—GaF$_3$, 3LiCl—GaF$_3$, 4LiCl—GaF$_3$, 3LiBr—GaF$_3$, 2LiCl—LiOH—GaF$_3$, 3LiCl-0.1LaCl$_3$-0.9GaF$_3$, 3LiCl-0.1InCl$_3$-0.9GaF$_3$, 3LiCl-0.1ScCl$_3$-0.9GaF$_3$, 3LiCl-0.1AlCl$_3$-0.9GaF$_3$, 3LiCl-0.1TlCl$_3$-0.9GaF$_3$, 3LiCl-0.1YCl$_3$-0.9GaF$_3$, 3LiCl-0.1BCl$_3$-0.9GaF$_3$, 2LiBr—GaF$_3$, 4LiBr—GaF$_3$, 2LiClO$_4$—GaF$_3$, 2LiClO$_4$—LiOH—GaF$_3$, 2LiCl—NaCl—GaF$_3$, 3LiCl—NaCl—GaF$_3$, 3LiCl—0.2LaCl$_3$-0.8GaF$_3$, 3LiCl-0.2InCl$_3$-0.8GaF$_3$, 3LiCl-0.3LaCl$_3$-0.7GaF$_3$, 3LiCl-0.3InCl$_3$-0.7GaF$_3$, 3LiCl-0.5LaCl$_3$-0.5GaF$_3$, 3LiCl-0.5InCl$_3$-0.5GaF$_3$, 3LiCl-0.2ScCl$_3$-0.8GaF$_3$, 3LiCl-0.3ScCl$_3$-0.7GaF$_3$, 3LiCl-0.5ScCl$_3$-0.5GaF$_3$, 3LiCl-0.2AlCl$_3$-0.8GaF$_3$, 3LiCl-0.3AlCl$_3$-0.7GaF$_3$, 3LiCl-0.5AlCl$_3$-0.5GaF$_3$, 3LiCl-0.2BCl$_3$-0.8GaF$_3$, 3LiCl-0.3BCl$_3$-0.7GaF$_3$, 3LiCl-0.5BCl$_3$-0.5GaF$_3$, 3LiCl-0.2TlCl$_3$-0.8GaF$_3$, 3LiCl-0.3TlCl$_3$-0.7GaF$_3$, 3LiCl-0.5TlCl$_3$-0.5GaF$_3$, 3LiCl-0.2YCl$_3$-0.8GaF$_3$, 3LiCl-0.3YCl$_3$-0.7GaF$_3$, 3LiCl-0.5YCl$_3$-0.5GaF$_3$, or a combination thereof.

The compound of Formula 1 exhibits a Cl 2p peak at a binding energy of 199 electron-volts (eV) to 203 eV, as obtained by X-ray photoelectron spectroscopy (XPS). The Cl 2p peak is a peak related with Ga—X such as a Ga—Cl bond, and is shifted in a high-binding energy direction, relative to a Cl 2p peak of a simple blend of LiX and GaF$_3$.

The compound of Formula 1 exhibits a primary peak at a diffraction angle of about 25°2θ to about 35°2θ, and a secondary peak at a diffraction angle of about 48°2θ to about 65°2θ, when analyzed by XRD analysis with Cu Kα radiation. Here, the primary peak has a maximum intensity, the primary peak and the secondary peak are related to crystalline properties such as LiCl, and the secondary peak has less intensity than the primary peak.

In an embodiment, the compound of Formula 1 exhibits a peak at a diffraction angle of about 29°2θ to about 31°2θ, about 33°2θ to about 35°2θ, and about 49°2θ to about 51°2θ, when determined by XRD analysis with Cu Kα radiation.

In an embodiment, the compound of Formula 1 exhibits a peak at a diffraction angle of 29°2θ to 31°2θ, 33°2θ to 35°2θ, 59°2θ to 61° 2θ, and 62°2θ to 64°2θ, when determined by XRD analysis with Cu Kα radiation.

The second solid electrolyte is an oxide-based solid electrolyte, and non-limiting examples thereof are garnet-based ceramic Li$_{3+x}$La$_3$M$_2$O$_{12}$ (wherein M is Te, Nb, or Zr, and x is an integer of 1 to 10), lithium phosphorous oxynitride (Li$_x$PO$_y$N$_z$, wherein $0<x<1$, $0<y<1$, and $0<z<1$), Li$_x$P$_y$O$_z$N$_K$ (wherein $2.7\leq x\leq 3.3$, $0.8\leq y\leq 1.2$, $3.5\leq z\leq 3.9$, and $0.1\leq k\leq 0.5$), Li$_w$PO$_x$N$_y$S$_z$ (wherein $0<w<1$, $0<x<1$, $0<y<1$, and $0<z<1$), Li$_{1+x+y}$Al$_x$Ti$_{2-x}$Si$_y$P$_{3-y}$O$_{12}$ (wherein $0<x<2$ and $0\leq y<3$), BaTiO$_3$, Pb(Zr$_a$Ti$_{1-a}$)O$_3$ $0\leq a\leq 1$ (PZT), Pb$_{1-x}$La$_x$Zr$_{1-y}$Ti$_y$O$_3$ (PLZT, wherein $0\leq x<1$ and $0\leq y<1$), Pb(Mg$_{1/3}$Nb$_{2/3}$)O$_3$—PbTiO$_3$ (PMN-PT), HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, SiC, lithium phosphate (Li$_3$PO$_4$), lithium titanium phosphate (Li$_x$Ti$_y$(PO$_4$)$_3$, wherein $0<x<2$ and $0<y<3$), lithium aluminum titanium phosphate (Li$_x$Al$_y$Ti$_z$(PO$_4$)$_3$, wherein $0<x<2$, $0<y<1$, and $0<z<3$), Li$_{1+x+y}$(Al$_a$Ga$_{1-a}$)$_x$(Ti$_b$Ge$_{1-b}$)$_{2-x}$Si$_y$P$_{3-y}$O$_{12}$ (wherein $0\leq a\leq 1$, $0\leq b\leq 1$, $0\leq x\leq 1$ and $0\leq y\leq 1$), lithium lanthanum titanate (Li$_x$La$_y$TiO$_3$, wherein $0<x<2$ and $0<y<3$), lithium germanium thiophosphate (Li$_x$Ge$_y$P$_z$S$_w$, wherein $0<x<4$, $0<y<1$, $0<z<1$, and $0<w<5$), lithium nitride-based glass (Li$_x$N$_y$, wherein $0<x<4$ and $0<y<2$), SiS$_2$ (Li$_x$Si$_y$S$_z$, wherein $0<x<3$, $0<y<2$, and $0<z<4$), a P$_2$S$_5$-based glass (Li$_x$P$_y$S$_z$, wherein $0<x<3$, $0<y<3$, and $0<z<7$), Li$_2$O, LiF, LiOH, Li$_2$CO$_3$, LiAlO$_2$, a Li$_2$O—Al$_2$O$_3$—SiO$_2$—P$_2$O$_5$—TiO$_2$—GeO$_2$-based ceramic, garnet-based ceramic Li$_{3+x}$La$_3$M$_2$O$_{12}$ (wherein M is Te, Nb, or Zr, and x is an integer of 1 to 10), or a combination thereof.

As the oxide-based solid electrolyte, for example, a garnet-based oxide-based solid electrolyte having excellent reduction stability when in contact with a lithium anode may be used. As the oxide-based solid electrolyte, a garnet-based ceramic Li$_{3+x}$La$_3$M$_2$O$_{12}$ (wherein M is Te, Nb, or Zr), for example, LLZO (Li$_{6.5}$La$_3$Zr$_{1.5}$Ta$_{0.5}$O$_{12}$) may be used.

As used herein, the term "garnet compound" or "garnet-based" means that the compound is isostructural with garnet, e.g., Mg$_3$Al$_2$(SiO$_4$)$_3$.

In the composite solid electrolyte according to an embodiment, the first solid electrolyte layer has a thickness of about 1 μm to about 300 μm, about 10 μm to about 200 μm, about 15 μm to about 180 μm, or about 20 μm to about 150 μm. Also, the second solid electrolyte layer has a thickness of, for example, about 1 μm to about 750 μm, about 5 μm to about 730 μm, about 7 μm to about 720 μm, about 10 μm to about 700 μm, about 10 μm to about 650 μm, about 20 μm to about 550 μm, about 30 μm to about 550 μm, or about 30 μm to about 500 μm.

In an embodiment, the composite solid electrolyte has a thickness of about 1 μm to about 800 μm, about 10 μm to about 750 μm, about 30 μm to about 800 μm, about 40 μm to about 700 μm, about 45 μm to about 680 μm, or about 50 μm to about 650 μm.

In terms of the rheological properties of the first solid electrolyte, the first solid electrolyte has a loss modulus of about 100 Pascals (Pa) or greater, for example, about 100 Pa to about 1,000,000 Pa, or about 100,000 Pa to about 1,000,000 Pa, and a storage modulus of about 100 MPa or less, for example, about 1 MPa to about 50 MPa.

The loss modulus (G″) and storage modulus (G′) may be measured according to ASTM D4065, D4440, and D5279, the content of which is incorporated herein by reference in its entirety, by measuring the viscosity of a powder with a rheometer by varying the shear rate. This will be described in greater detail below.

The viscosity is measured using a TA Instruments AR 2000 with a cone and plate rheometer. While an electrolyte sample having a thickness of about 1 nm is placed between a cone having a cone angle of 2° and a plate having a diameter of 40 mm. Rheological evaluation is performed by applying a 1% strain constantly by varying the shear rate.

The first solid electrolyte, i.e., the first solid electrolyte layer is flexible, and thus, the thickness thereof may be reduced to be 100 μm or less. The thickness of the first solid electrolyte maybe about 1 μm to about 100 μm, for example about 1 μm about 50 μm. The first solid electrolyte has flexible characteristics, and thus, is useful when implementing a flexible solid secondary battery. The composition of the first solid electrolyte may be identified using an inductively coupled plasma spectrometer (ICP).

The clay characteristic maintenance temperature of the first solid electrolyte may be about −60° C. to about 160° C., about −50° C. to about 150° C., or about −40° C. to about 140° C. The clay characteristic maintenance temperature is determined according to the following method.

A glass transition temperature is identified through differential scanning calorimetry (DSC) analysis. DSC analysis conditions are as follows: 50-100 mg of a sample is put into a DSC pan, sealed, and subject to measurement with TA Instruments Discovery DSC equipment in a temperature range of −80° C. to 200° C. in a condition of a temperature range of 10° C. per minute, wherein in a DSC curve with respect to temperature, the temperature range in which the slope is maintained constant around a specific temperature with different y-intercepts is identified as a glass transition temperature.

In the case where the compound of Formula 1 has a glass-ceramic structure, the amount of the ceramic is about 0.1 wt % to about 30 wt %, about 0.5 wt % to about 25 wt %, about 1 wt % to about 20 wt %, based on a total weight of the compound. The amount of the ceramic may vary depending on the amount of LiX and QX of the starting materials forming the solid electrolyte.

The compound of Formula 1 is electrochemically stable at 2.0 V to 4.6 V, for example, 2.4 V to 4.1 V, with respect to lithium metal. The compound of Formula 1 may be present as particles. The average particle diameter of the particles may be about 5 nm to about 500 um, for example about 100 nm to about 100 um, for example about 1 um to about 50 um, and the specific surface area thereof is about 0.01 square meters per gram ($m^2/g$) to about 1000 $m^2/g$, for example, about 0.5 $m^2/g$ to about 100 $m^2/g$. Particle diameter maybe determined by light scattering, and surface area may be determined by nitrogen isotherms.

A method of manufacturing the composite solid electrolyte according to an embodiment is described as follows.

In an aspect, the manufacturing the composite solid electrolyte comprises: providing a first solid electrolyte layer; providing a second solid electrolyte layer; disposing on the second solid electrolyte layer a lithium ion-conductive interlayer; and disposing on the lithium ion-conductive interlayer the first solid electrolyte layer to prepare the composite solid electrolyte, wherein the first solid electrolyte comprises a halide solid electrolyte, wherein the second solid electrolyte comprises an oxide solid electrolyte, wherein the disposing of the lithium ion-conductive interlayer comprises: coating a lithium ion-conductive interlayer precursor on the second solid electrolyte, and heat treating the lithium ion-conductive interlayer precursor to form the lithium ion-conductive interlayer; or coating the lithium ion-conductive interlayer precursor on a substrate, and heat treating the lithium ion-conductive interlayer precursor to prepare the lithium ion-conductive interlayer, separating the lithium ion-conductive interlayer from the substrate, and stacking the separated lithium ion-conductive interlayer on the second solid electrolyte.

The composite solid electrolyte according to an embodiment may be manufactured by: arranging a lithium ion-conductive interlayer on a second solid electrolyte comprising the oxide-based solid electrolyte; and arranging on the lithium ion-conductive interlayer a first solid electrolyte comprising a halide solid electrolyte.

The arranging of the lithium ion-conductive interlayer may be performed, for example, by i) coating a lithium ion-conductive interlayer precursor on the second solid electrolyte and heat treating to form the lithium ion-conductive interlayer.

The arranging of the lithium ion-conductive interlayer may be performed by, for example, ii) coating a lithium ion-conductive interlayer precursor on a substrate, e.g., a support substrate, and heat treating to form a lithium ion-conductive interlayer; separating the lithium ion-conductive interlayer from the support substrate; and stacking the separated lithium ion-conductive interlayer on the second solid electrolyte.

The heat treating of the lithium ion-conductive interlayer may comprise heat treating at about 200° C. to about 700° C., about 250° C. to about 600° C., or about 280° C. to about 500° C. When the heat treating is performed within these ranges, a side reaction of the first solid electrolyte with the second solid electrolyte may be effectively inhibited.

According to the composition of a lithium ion-conductive compound of the lithium ion-conductive interlayer, a corresponding precursor of the lithium ion-conductive compound may be used.

In the case where the lithium ion-conductive interlayer according to an embodiment contains $Li_{2+x}C_{1-x}B_xO_3$ (wherein 0<x<1), a precursor of the lithium ion-conductive compound may comprise, for example, LiOH, $H_3BO_3$, and carboxymethylcellulose (CMC). The amounts of LiOH, $H_3BO_3$, and CMC may be stoichiometrically selected to obtain $Li_{2+x}C_{1-x}B_xO_3$ (wherein 0<x<1).

In a method of preparing the first solid electrolyte, the first solid electrolyte may be prepared by obtaining i) a mixture of LiX, optionally QX, and $M_zZ_{3z}$, ii) a mixture of LiX, optionally QX, $M_zZ_{3z}$, and $Ga_{1-z}F_{3-3z}$, or iii) a mixture of LiX, optionally QX, and $M_zZ_{3z}Ga_{1-z}F_{3-3z}$, and mechanically milling the mixture.

The amount of each component in the mixture is stoichiometrically selected to obtain the compound represented by Formula 1. In i) the mixture of LiX, QX, and $M_zZ_{3z}$, ii) the mixture of LiX, QX, $M_zZ_{3z}$, and $Ga_{1-z}F_{3-3z}$, or iii) the mixture of LiX, QX, and $M_zZ_{3z}Ga_{1-z}F_{3-3z}$, Q, X, M, Z, and z are defined the same as Q, X, M, Z, and z of Formula 1.

Mechanical milling uses the principle of coating by generating surface energy with mechanical energy and bonding and/or fusion between interfaces having high surface energy.

Mechanical milling may be carried out by mechanically contacting the components of the mixture, for example, by mixing, e.g., rotating, at about 100 rpm to about 3,000 rpm, about 300 rpm to about 1,000 rpm, or about 500 to about 800 rpm to apply a compressive stress mechanically. The mechanical milling may be performed by ball milling, air jet milling, bead milling, roll milling, planetary milling, hand milling, high-energy ball milling, stirred ball milling, vibration milling, mechanofusion milling, shaker milling, attritor milling, disk milling, shape milling, nauta milling, nobilta milling, high-speed mixing, or a combination thereof. However, the present disclosure is not limited thereto.

The mechanical milling may be performed using a ball mill, an air jet mill, a bead mill, a roll mill, a planetary mill, or a hand mill, for example.

The mechanical milling may be carried out, for example, under an inert gas atmosphere. The inert gas atmosphere may comprise nitrogen, argon, or helium.

The method may further include leaving the mixture to stand after the mechanical milling. Through the standing, the temperature of a product from the mechanical milling may be reduced. Through the standing, the temperature of the product having undergone the mechanical milling may be controlled to 80° C. or lower, for example, about 20° C. to about 80° C.

The first solid electrolyte can be provided without a separate heat treatment, unlike the process of preparing other solid electrolytes. After the mechanical milling of the mixture to obtain the first solid electrolyte, a separate heat treatment process can be omitted. If the heat treatment process is further performed, it can be difficult to obtain the solid electrolyte according to an embodiment.

When the mechanical milling of the mixture is carried out as described above, the particle size of the product obtained through the mechanical milling may be selected. The particle size of the product obtained through the mechanical milling may be selected to be 1 μm or less, about 0.01 μm to about 0.9 μm, about 0.01 μm to about 0.7 μm, for example, about 0.01 μm to about 0.5 μm. When the particle size thereof is selected to be within these ranges, finally a first solid electrolyte having improved density may be obtained. As used herein, the "particle size" indicates a particle diameter when the particle is spherical, and indicates a length of the major axis of the particle when the particle is not spherical.

The mechanical milling is, for example, high-energy milling. Such high-energy milling may use, for example, Pulverisette 7 Premium line equipment. When high-energy milling is performed in this way, the size of the components of the mixture may be miniaturized, so that the reactions thereof may be facilitated, and thus a solid electrolyte may be prepared within a short time.

After the standing, the mechanical milling process and the standing may be repeatedly performed. One cycle consisting of mechanical milling and standing may be repeatedly performed, for example, a total of 50 to 100 cycles may be performed.

The above-described mechanical milling time and the standing time are variable, but, for example, the standing time may be selected to be shorter than the mechanical milling time. The mechanical milling time is, for example, about 5 min to about 20 hours, for example, about 5 hours to about 15 hours, and the standing time is, for example, about 1 min to about 15 hours, about 2 min to about 20 min, or about 5 min.

In Formula 1, LiX may be LiCl, LiBr, LiOH, LiClO$_4$, or a combination thereof, and QX may be NaX, KX, or a combination thereof.

NaX and KX may be NaCl, NaBr, KCl, KBr, or a combination thereof.

In Formula 1, M$_z$Z$_{3z}$ may be LaCl$_3$, InCl$_3$, AlCl$_3$, YCl$_3$, TlCl$_3$, ScCl$_3$, BCl$_3$ or a combination thereof, the Ga$_{1-z}$F$_{3-3z}$ may be GaF$_3$, the M$_z$Z$_{3z}$Ga$_{1-z}$F$_{3-3z}$ may be LaCl$_3$GaF$_3$, InCl$_3$GaF$_3$, AlCl$_3$GaF$_3$, YCl$_3$GaF$_3$, TlCl$_3$GaF$_3$, ScCl$_3$GaF$_3$, BCl$_3$GaF$_3$, or a combination thereof.

According to another aspect, provided is an electrochemical device including the composite solid electrolyte according to an embodiment.

In an embodiment, the electrochemical device is, for example, an electrochemical cell, e.g., a storage battery, a super capacitor, a fuel cell, a sensor, or a chromic device. The sensor may be, for example, a moisture sensor.

According to another aspect, provided is an electrochemical cell including the composite solid electrolyte according to an embodiment.

The electrochemical cell may be a secondary battery including a cathode, an anode, and the composite solid electrolyte according to an embodiment interposed between the cathode and the anode. At least one selected from the cathode and the anode may contain the composite solid electrolyte according to an embodiment.

The secondary battery may be a secondary battery including a cathode, an anode containing lithium, and the composite solid electrolyte according to an embodiment disposed between the cathode and the anode. The secondary battery may be, for example, a lithium secondary battery, a lithium air battery, a solid secondary battery, or the like, and may be, among these examples, a solid secondary battery.

The electrochemical cell can be a primary or a secondary battery, and the shape of the electrochemical cell is not particularly limited, and may be, for example, a coin type, a button type, a sheet type, a stacked type, a cylinder type, a flat type, or a horn type. In an embodiment, the electrochemical cell may also be applied to medium and large-sized batteries for electric vehicles.

The electrochemical cell may be, for example, a solid secondary battery using a precipitation-type anode. The precipitation-type anode refers to an anode that has a first anode active material layer containing no anode active material at the time of assembly of the electrochemical cell, and contains an anode material such as lithium metal that precipitates after the electrochemical cell is charged.

In an embodiment, the composite solid electrolyte may be a cathode electrolyte, an electrolyte protective film, a cathode protective film, an anode protective film, or a combination thereof.

In an embodiment, the composite solid electrolyte may have a high oxidation stability potential, e.g., a oxidation stability potential of about 3.5 V vs. Li/Li$^+$, or more, for example about 4.6 V to about 5.0 V vs. Li/Li$^+$, and thus, may be used as a cathode electrolyte (catholyte), for example, a catholyte for a solid secondary batteries. The composite solid electrolyte according to an embodiment may be substituted for an ionic-liquid-containing electrolyte in a solid secondary battery using an existing oxide-based solid electrolyte.

The first solid electrolyte constituting the composite solid electrolyte according to an embodiment may be prepared using the compound of Formula 1 without a sintering process. The first solid electrolyte is flexible with excellent formability, and thus may have any suitable shape or thickness, and for example, may be prepared as an electrolyte having a thickness of 100 μm or less through a roll-to-roll process.

The solid secondary battery may further include an ionic-liquid-containing electrolyte. The ionic-liquid-containing electrolyte may be further disposed between the cathode and the composite solid electrolyte.

The lithium anode may be a lithium metal electrode or a lithium alloy electrode. By employing a lithium anode as described above, high energy density per volume of a solid secondary battery may be realized.

The composite solid electrolyte according to an embodiment may be used as a cathode protective film to effectively reduce or avoid a reaction between the composite solid electrolyte and the cathode.

FIG. 1 is a schematic cross-sectional view showing a structure of an electrochemical cell according to an embodiment.

Referring to FIG. 1, a composite solid electrolyte 30 according to an embodiment is arranged between an anode 20 and a cathode 10. The composite solid electrolyte 30 includes a first solid electrolyte 31 arranged adjacent to the cathode 10 and a second solid electrolyte 33 arranged adjacent to the anode 20. A lithium ion-conductive interlayer 32 is arranged between the first solid electrolyte 31 and the second solid electrolyte 33. The first solid electrolyte comprises a halide solid electrolyte. By the arrangement of the lithium ion-conductive interlayer 32, diffusion of a halogen of the halide solid electrolyte into the second solid electrolyte 33 may be effectively blocked.

The first solid electrolyte 31 can be provided without the application of high-pressure when forming a battery, and the interface between the cathode and the first solid electrolyte may achieve very uniform contact therebetween.

The cathode 10 may include a cathode current collector 11 and a cathode active material layer 12.

The first solid electrolyte 31 has excellent compatibility with the cathode active material 12, and may be used as a cathode electrolyte (catholyte) in place of an existing ionic-liquid-containing electrolyte. The ionic-liquid-containing electrolyte may be, for example, a liquid electrolyte containing an ionic liquid.

The ionic liquid may be, for example, N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

The electrochemical cell of FIG. 1 may be, for example, a solid secondary battery.

In the electrochemical cell according to an embodiment, an ionic-liquid-containing electrolyte may be further disposed between the first solid electrolyte 31 and the cathode 10.

Figure 11:
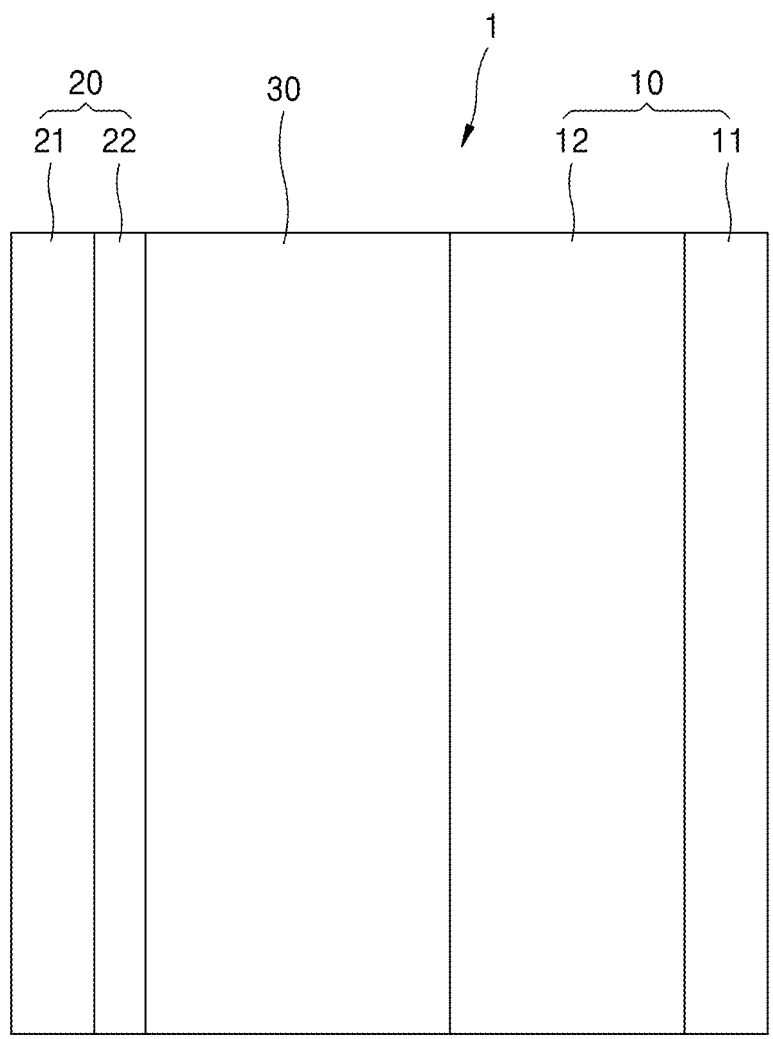
FIGS. 11 to 13 are each a cross-sectional view showing schematic structures of an embodiment of a solid secondary battery.
Figure 12:
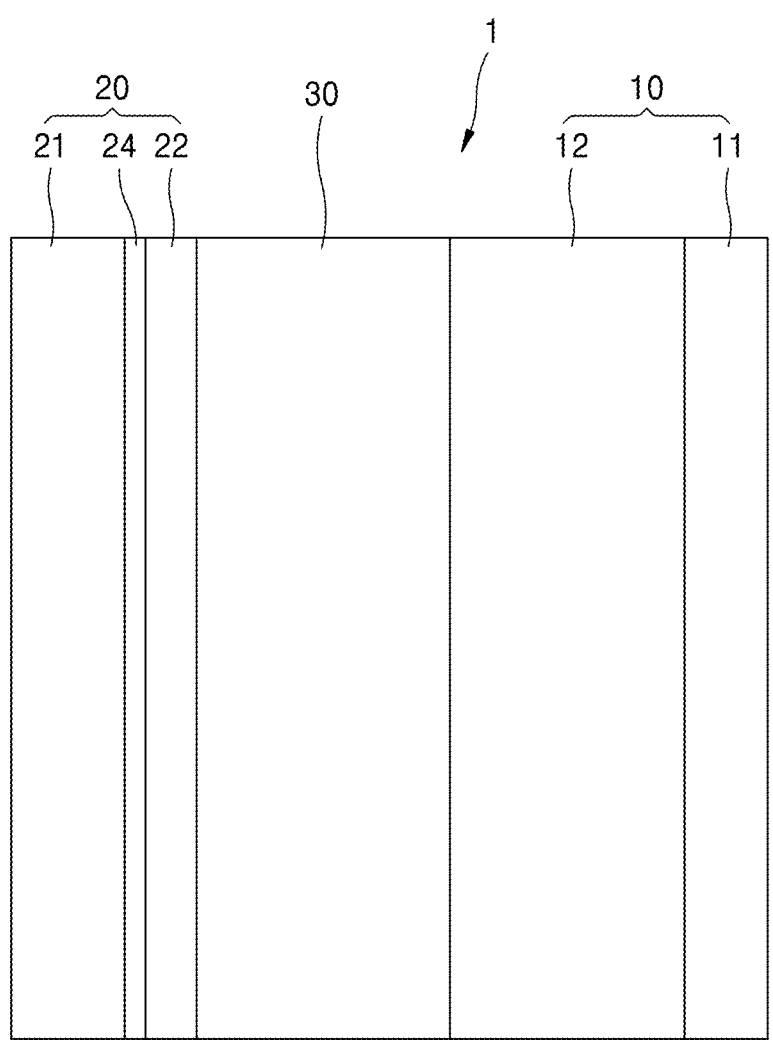

FIGS. 11 to 12 are schematic cross-sectional views showing the structure of an embodiment of a solid secondary battery, each including the composite solid electrolyte.

Referring to FIG. 11, a configuration of a solid secondary battery 1 according to an embodiment will be further described.

The solid secondary battery 1 may include, as shown in FIG. 11, a cathode 10, an anode 20, and an electrolyte 30. The solid secondary battery may be manufactured by stacking the electrolyte 30 to be arranged between the cathode 10 and the anode 20 and pressing the same.

The pressing method may be, for example, isotactic press, roll press, flat press, cold isostatic press (CIP), or the like, but is not limited to these methods, and any suitable pressing method used in the art may be used. A pressure applied during the pressing is, for example, 500 megaPascals (MPa) or less, about 50 MPa to about 500 MPa, about 50 MPa to about 300 MPa, about 50 MPa to about 250 MPa, about 50 MPa to about 150 MPa, or about 50 MPa to about 100 MPa.

The pressure application time is, for example, about 30 minutes (min) or less, 1 millisecond (ms) to about 30 min, about 1 ms to about 20 min, about 1 ms to about 15 min, or about 1 ms to about 10 min.

In an embodiment, heat treatment may not be performed during the pressing. If desired, the pressing is performed at room temperature to a temperature of 90° C. or less, or a temperature of about 20° C. to about 90° C. In another embodiment, the pressing may be performed at a temperature of about 100° C. or more, e.g., about 100° C. to about 200° C.

At least one of the cathode 10, the anode 20, or the electrolyte 30 may contain the composite solid electrolyte according to an embodiment. For example, the cathode 10 may contain the first solid electrolyte, and the electrolyte 30 may contain the composite solid electrolyte.

The cathode 10 may include a cathode current collector 11 and a cathode active material layer 12.

As the cathode current collector 11, a plate or foil comprising indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof may be used. The cathode current collector 11 may be omitted.

The cathode active material layer 12 may include a cathode active material and a solid electrolyte. The solid electrolyte included in the cathode 10 may be the same as, similar to, or different from the first solid electrolyte included in the composite solid electrolyte 30. For example, during a process of manufacturing a battery containing a cathode/composite solid electrolyte/anode assembly, the first solid electrolyte of the composite solid electrolyte may diffuse into the cathode. The first solid electrolyte may be added into the cathode active material layer 12 during a cathode manufacturing process, and contained in the cathode.

A cathode active material may be a compound that reversibly absorbs and desorbs lithium ions, for example, may comprise a lithium transition metal oxide having a layered crystal structure, a lithium transition metal oxide having an olivine crystal structure, a lithium transition metal oxide having a spinel crystal structure, or combination thereof. The cathode active material may be a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, a lithium transition metal phosphate such as lithium iron phosphate, or the like, nickel sulfide, copper sulfide, lithium sulfide, iron oxide, or vanadium oxide, but is not limited thereto. The cathode active material may comprise any suitable cathode active material that is used as a cathode active material in the related art. These cathode active materials may be single materials or a mixture of two or more materials.

The lithium transition metal oxide may be, for example, a compound represented by at least one of the following formulae: $Li_aA_{1-b}B'_bD_2$ (wherein $0.90 \leq a \leq 1$ and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_2$ (wherein $0.90 \leq a \leq 1$, $0 \leq b \leq 0.5$, $c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2GbO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. In these compounds, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. A compound having a coating layer added on the surface of these compounds, and a mixture of any of the above-listed compounds and a compound having a coating layer added thereto may be used. The coating layer added to the surface of these compounds may include, for example, a coating element compound, such as an oxide of a coating element, a hydroxide of a coating element, an oxyhydroxide of a coating element, an oxycarbonate of a coating element, or a hydroxycarbonate of a coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming the coating layer may be selected within a range that does not adversely affect the physical properties of the cathode active material. The coating method may be, for example, spray coating, a dipping method, or the like. A detailed description of the coating method will be omitted because the coating method may be well understood to those skilled in the field.

The cathode active material may be, for example, a lithium ternary transition metal oxide such as $LiNi_xCo_yAl_zO_2$ (NCA) or $LiNi_xCo_yMn_zO_2$ (NCM) (wherein $0<x<1$, $0<y<1$, $0<z<1$, and $x+y+z=1$).

The cathode active material may be covered by a coating layer. In embodiments, the coating layer may be any suitable coating layer known in the art as a coating layer for the cathode active material of a solid secondary battery. An example of the coating layer may be, for example, $Li_2O$—$ZrO_2$.

In addition, when the cathode active material is formed of a lithium ternary transition metal oxide such as NCA or NCM, the solid secondary battery 1 using the cathode active material may have an increased capacity density, so that the elution of metal of the cathode active material in a charged state may be reduced. Accordingly, the long-term reliability and cycle characteristics in a charged state of the solid secondary battery 1 according to an embodiment may be improved.

Here, the cathode active material may be, for example, in the form of particles, such as elliptical or spherical particles. The particle diameter of the cathode active material is not particularly limited, and may be within a range that is applicable to the cathode active material of an existing solid secondary battery in the prior art. In addition, the content of the cathode active material of the cathode 10 is also not particularly limited, and may be within any suitable range applicable to the cathode.

The cathode 10 may appropriately include an additive such as a conductive agent, a binder, a filler, a dispersant, or an ion-conductive auxiliary agent, in addition to the above-described cathode active material and solid electrolyte.

Examples of the conductive agent that may be blended in the cathode 10 may include graphite, carbon black, acetylene black, Ketjen black, carbon fiber, or a metal powder. Examples of the binder that may be blended in the cathode 10 may include styrene butadiene rubber (SBR), polytetrafluoroethylene, polyvinylidene fluoride, or polyethylene. The conductive agent, dispersant, or ion-conductive auxiliary agent, may be blended in the cathode 10.

The anode 20 may include an anode current collector 21 and a first anode active material layer 22.

An anode active material included in the first anode active material layer 22 may be, for example, in the form of particles. The anode active material in the form of particles may have an average particle diameter of, for example, 4 micrometers (um) or less, 3 um or less, 2 um or less, 1 um or less, or 900 nm or less. The anode active material in the form of particles may have an average particle diameter of, for example, about 10 nanometers (nm) to 4 um or less, about 10 nm to 3 um or less, about 10 nm to 2 um or less, about 10 nm to 1 um or less, or about 10 nm to 900 nm or less. As the anode active material has an average particle diameter within these ranges, this may further facilitate reversible absorption and/or desorption of lithium during charging and discharging. The average particle diameter of the anode active material is, for example, a median diameter (D50) measured using a laser particle size distribution analyzer.

The anode active material included in the first anode active material layer 22 may include, for example, a carbonaceous anode active material, a metal anode active material, a metalloid anode active material, or combination thereof.

In particular, the carbonaceous anode active material is amorphous carbon. The amorphous carbon can be, for example, carbon black (CB), acetylene black (AB), furnace black (FB), Ketjen black (KB), graphene, or the like, but is not limited thereto. The amorphous carbon may be any suitable material classified as amorphous carbon in the art. The amorphous carbon is carbon having no or very low crystallinity and distinguished from crystalline carbon or graphitic carbon.

The metal anode active material or metalloid anode active material includes gold (Au), platinum (Pt), palladium (Pd), silicon (Si), silver (Ag), aluminum (Al), bismuth (Bi), tin (Sn), zinc (Zn), or a combination thereof. The metal anode active material or metalloid anode active material may be any suitable material used as a metal anode active material or metalloid anode active material that forms an alloy or compound with lithium in the art. For example, because nickel (Ni) does not form an alloy with lithium, nickel is not a metal anode active material.

The first anode active material layer 22 may comprise a single kind of anode active material or a mixture of a plurality of different anode active materials. For example, the first anode active material layer 22 includes amorphous carbon alone, or gold (Au), platinum (Pt), palladium (Pd), silicon (Si), silver (Ag), aluminum (Al), bismuth (Bi), tin (Sn), zinc (Zn), or a combination thereof. As another example, the first anode active material layer 22 may comprise a mixture of amorphous carbon with gold (Au), platinum (Pt), palladium (Pd), silicon (Si), silver (Ag), aluminum (Al), bismuth (Bi), tin (Sn), zinc (Zn), or a combination thereof. A ratio in a mixture of amorphous carbon and, for example, gold, may be, by weight, for example, 10:1 to 1:2, 5:1 to 1:1, or 4:1 to 2:1, but is not limited thereto. The suitable ratio may be selected according to desired characteristics of the solid secondary battery 1. As the anode active material has a composition within these ranges, the solid secondary battery 1 has further improved cycle characteristics.

The anode active material included in the first anode active material layer 22 may include, for example, a mixture of first particles consisting of amorphous carbon and second particles consisting of a metal or a metalloid. The metal or metalloid includes, for example, gold (Au), platinum (Pt), palladium (Pd), silicon (Si), silver (Ag), aluminum (Al), bismuth (Bi), tin (Sn), zinc (Zn), or the like. In other words, the metalloid is a semiconductor. The amount of the second particles is about 8 wt % to about 60 wt %, about 10 wt % to about 50 wt %, about 15 wt % to about 40 wt %, or about 20 wt % to 30 wt % with respect to the total weight of the mixture. As the amount of the second particles is within these ranges, for example, the solid secondary battery 1 has further improved cycle characteristics.

The first anode active material layer includes, for example, a binder. The binder may be, for example, styrene butadiene rubber (SBR), polytetrafluoroethylene (PTEE), polyvinylidene fluoride (PVDF), polyethylene, a vinylidene fluoride/hexafluoropropylene copolymer, polyacrylonitrile, polymethyl methacrylate, or the like, but is not limited thereto. The binder may be any suitable material that is used as a binder in the art. The binder may consist of one binder alone or a plurality of different binders.

By the inclusion of a binder in the first anode active material layer 22, the first anode active material layer 22 is stabilized on the anode current collector 21. In addition, despite a change in volume and/or relative position of the first anode active material layer 22 during charging and discharging, cracking of the first anode active material layer 22 is suppressed. For example, in a case where the first anode active material layer 22 does not include a binder, the first anode active material layer 22 may be easily separated from the anode current collector 21. At a portion of the anode current collector 21 separated from the anode current collector 21, the first anode active material layer 22 is exposed and contacts the solid electrolyte layers, and thus, a short circuit is highly likely to occur. The first anode active material layer 22 is formed by, for example, coating, on the anode current collector 21, a slurry in which materials constituting the first anode active material layer 22 are dispersed, and drying the slurry. By the inclusion of a binder in the first anode active material layer 22, the anode active material may be stably dispersed in the slurry. For example, in the case of coating the slurry on the anode current collector 21 by screen printing, clogging of the screen (for example, clogging caused by aggregates of the anode active material) may be suppressed.

The thickness of the first anode active material layer 22 may be, for example, 50% or less, 40% or less, 30% or less, 20% or less, 10% or less, or 5% or less of the thickness of a cathode active material layer. The thickness of the first anode active material layer may be, for example, about 1 um to about 20 um, about 2 um to about 10 um, or about 3 um to about 7 um. When the thickness of the first anode active material layer is too small, lithium dendrite formed between the first anode active material layer 22 and the anode current collector 21 collapses the first anode active material layer, and thus, it is difficult to improve the cyclic characteristics of the solid secondary battery 1. When the thickness of the first anode active material layer 22 is excessively increased, the energy density of the solid secondary battery 1 is reduced and the internal resistance of the solid secondary battery 1, caused by the first anode active material layer, is increased, and thus, it is difficult to improve the cyclic characteristics of the solid secondary battery 1.

As the thickness of the first anode active material layer 22 decreases, the charging capacity of the first anode active material layer 22 also decreases. The charge capacity of the first anode active material layer 22 may be, for example, 50% or less, 40% or less, 30% or less, 20% or less, 10% or less, 5% or less, or 2% or less of the charge capacity of the cathode active material layer 12. The charge capacity of the first anode active material layer 22 may be, for example, about 0.1% to about 50%, about 0.1% to about 30%, about 0.1% to about 10%, about 0.1% to about 5%, or about 0.1% to about 2% of the charge capacity of the cathode active material layer 12. When the charge capacity of the first anode active material layer 22 is too small, the thickness of the first anode active material layer 22 becomes very small, so that a lithium dendrite formed between the first anode active material layer 22 and the anode current collector 21 during repeated charging and discharging processes may collapse the first anode active material layer 22, and thus, it is difficult to improve the cyclic characteristics of the solid secondary battery 1. When the charge capacity of the first anode active material layer 22 is excessively increased, the energy density of the solid secondary battery 1 decreases and the internal resistance of the solid secondary battery 1, caused by the first anode active material layer 22, is increased, and thus, it is difficult to improve the cyclic characteristics of the solid secondary battery 1.

The charge capacity of the cathode active material layer 12 is obtained by multiplying the specific charge-capacity (e.g., in mAh/g) of the cathode active material by the mass of the cathode active material in the cathode active material layer 12. When several types of cathode active materials are used, the charge-capacity density of each cathode active material is multiplied by the mass value thereof, and the sum of the obtained multiplication results is calculated as the charge capacity of the cathode active material layer 12. The charge capacity of the first anode active material layer 22 is also calculated in the same manner. That is, the charge capacity of the first anode active material layer 22 is obtained by multiplying the specific charge-capacity (e.g., in mAh/g) of the anode active material by the mass of the anode active material in the first anode active material layer 22. When several types of anode active materials are used, the specific charge-capacity of each anode active material is multiplied by the mass value thereof, and the sum of the obtained multiplication results is calculated as the charge capacity of the anode active material layer 22. Here, the specific charge-capacities of the cathode active material and the anode active material is an estimated capacity obtained using a solid half-cell with lithium metal as a counter electrode. By measuring the charge capacity using a solid half-cell, the charge capacity of each of the cathode active material layer 12 and the first anode active material layer 22 is directly measured. By dividing the measured charging capacity by the mass of each active material, the specific charge-capacity thereof is obtained. Alternatively, the charge capacity of each of the cathode active material layer 12 and the first anode active material layer 22 may be the initial charging capacity measured during the 1st cycle charging.

For example, the anode current collector 21 consists of materials that do not react with lithium, that is, materials that form neither an alloy nor a compound. Materials constituting the anode current collector 21 are, for example, copper (Cu), stainless steel, titanium (Ti), iron (Fe), cobalt (Co), nickel (Ni), or the like, but are not limited thereto. Any suitable materials used for electrode current collectors in the art may be used. The anode current collector 21 may consist of one of the above-listed metals, or may consist of an alloy or coating material of two or more metals thereof. The anode current collector 21 may be, for example, in the form of a plate or foil.

The first anode active material layer 22 may further include an additive used in an existing solid secondary battery 1, for example, a filler, a dispersant, an ion-conductive agent, or the like.

Referring to FIG. 12, for example, the solid secondary battery 1 may further include, between the anode current collector 21 and the first anode active material layer, a thin film 24 including an element capable of forming an alloy with lithium. The thin film 24 may be placed between the anode current collector 21 and the first anode active material layer 22. The thin film 24 includes, for example, an element capable of forming an alloy with lithium. The element capable of forming an alloy with lithium is, for example, gold, silver, zinc, tin, indium, silicon, aluminum, bismuth, or the like, but is not limited thereto, and can be any suitable element known in the art that may form an alloy with lithium. The thin film 24 consists of one of these metals, or an alloy of these different metals. As the thin film 24 is located on the anode current collector 21, for example, a second anode active material layer (not shown) deposited between the thin film 24 and the first anode active material layer 22 may have a more planarized form, and the solid secondary battery 1 may have further improved cyclic characteristics.

The thin film 24 may have a thickness of, for example, about 1 nm to about 800 nm, about 10 nm to about 700 nm, about 50 nm to about 600 nm, or about 100 nm to about 500 nm. When the thickness of the thin film 24 is less than 1 nm, it may be difficult to exhibit the function of the thin film 24. When the thickness of the thin film 24 is too large, the thin film 24 itself may absorb lithium, and thus, the amount of lithium precipitated is reduced, thus reducing the energy density of the solid secondary battery 1 and deteriorating the cyclic characteristics of the solid secondary battery 1. The thin film 24 may be disposed on the anode current collector 21 by, for example, a vacuum deposition method, a sputtering method, or a plating method, but not limited to these methods, and any suitable method known in the art capable of forming the thin film 24 may be used.

Figure 13:
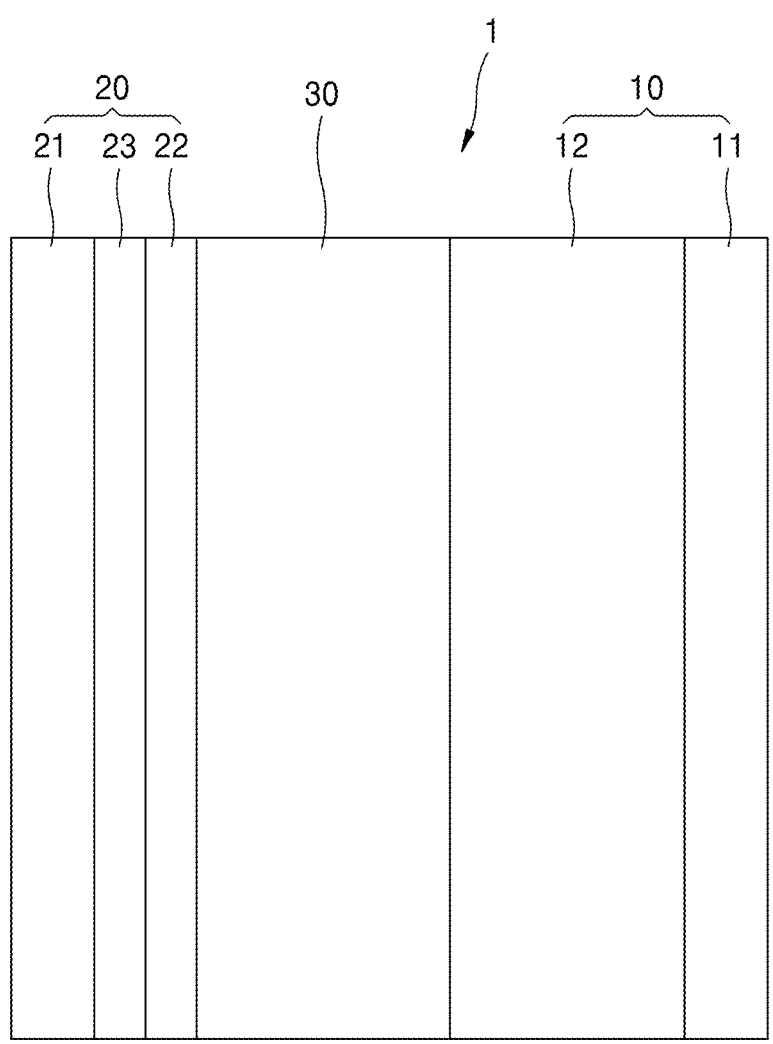

Referring to FIG. 13, the solid secondary battery 1 may further include, for example, a second anode active material layer 23 that is formed between the anode current collector 21 and the solid electrolyte 30 by charging. For example, the solid secondary battery 1 may further include a second anode active material layer 23 formed between the anode current collector 21 and the first anode active material layer 22 by charging. The second anode active material layer 23 is a precipitation layer that is not present at the time of assembly of the solid secondary battery 1 and is formed between the anode current collector 21 and the solid electrolyte 30 during charging. In the solid secondary battery of FIG. 12, the precipitation layer may be disposed between the anode current collector 21 and the thin film 24 or between the thin film 24 and the first anode active material layer 22.

The second anode active material layer 23 may be a metal layer containing lithium or a lithium alloy. The metal layer includes lithium or a lithium alloy. Accordingly, since the second anode active material layer 23 is a metal layer containing lithium, the second anode active material layer 23 may act as, for example, a lithium reservoir. The lithium alloy is, for example, a Li—Al alloy, a Li—Sn alloy, a Li—In alloy, a Li—Ag alloy, a Li—Au alloy, a Li—Zn alloy, a Li—Ge alloy, a Li—Si alloy, or the like, but is not limited thereto, and may be any suitable lithium alloy used in the art. The second anode active material layer 23 may consist of lithium or one of these alloys, or may consist of different alloys.

The second anode active material layer 23 has a thickness of, for example, but not specifically limited to, about 1 um to about 1,000 um, about 1 um to about 500 um, about 1 um to about 200 um, about 1 um to about 150 um, about 1 um to about 100 um, or about 1 um to about 50 um. When the thickness of the second anode active material layer 23 is too small, the second anode active material layer 23 may not act as a lithium reservoir. When the thickness of the second anode active material layer 23 is too large, the mass and volume of the solid secondary battery 1 increase, and rather the cyclic characteristics thereof are likely to be deteriorated. The second anode active material layer 23 may be, for example, a metal foil having a thickness within these ranges.

In the solid secondary battery 1, as described above, for example, the second anode active material layer 23 may be disposed between the anode current collector 21 and the first anode active material layer 22 before assembly of the solid secondary battery 1, or may be deposited between the anode current collector 21 and the first anode active material layer 22 by charging after assembly of the solid secondary battery 1.

In a case where the second anode active material layer 23 is disposed between the anode current collector 21 and the first anode active material layer 22 before assembly of the solid secondary battery 1, the second anode active material layer 23 is a metal layer including lithium, and thus acts as a lithium reservoir. The solid secondary battery 1 including the second anode active material layer 23 has further improved cyclic characteristics. For example, before assembly of the solid secondary battery 1, a lithium foil may be disposed between the anode current collector 21 and the first anode active material layer 22.

In a case where the second anode active material layer 23 is formed by charging after assembly of the solid secondary battery 1, as the solid secondary battery 1 does not include the second anode active material layer 23 during assembly, the solid secondary battery 1 may have increased energy density. For example, when charging the solid secondary battery 1, the solid secondary battery 1 is charged to exceed the charge capacity of the first anode active material layer 22. That is, the first anode active material layer 22 is overcharged. At the initial stage of charging, lithium is absorbed into the first anode active material layer 22. That is, the anode active material included in the first anode active material layer 22 forms an alloy or compound with lithium ions migrated from the cathode 10. When charging is performed to exceed the capacity of the first anode active material layer 22, for example, lithium precipitates on the rear surface of the first anode active material layer 22, that is, between the anode current collector 21 and the first anode active material layer 22, and a metal layer, which corresponds to the second anode active material layer 23, is formed by the precipitated lithium. The second anode active material layer 23 is a metal layer consisting mainly of lithium (that is, metallic lithium). This result is obtained as a result of that the anode active material included in the first anode active material layer 22 consists of a material that forms an alloy or compound with lithium. During discharging, lithium in the metal layers, i.e., the first anode active material layer 22 and the second anode active material layer 23, is ionized and migrate toward the cathode 10. Accordingly, in the solid secondary battery 1, lithium may be used as the anode active material. In addition, since the first anode active material layer 22 covers the second anode active material layer 23, the first anode active material layer 22 acts as a protective layer for the second anode active material layer 23, that is, a metal layer, and at the same time inhibits the precipitation growth of lithium dendrite. Accordingly, a short circuit and capacity reduction in the solid secondary battery 1 are suppressed, and as a result, the solid secondary battery 1 has improved cyclic characteristics. In addition, in a case where the second anode active material layer 23 is formed by charging after the solid secondary battery 1 is assembled, the anode current collector 21, the first anode active material layer 22, and a region therebetween are, for example, Li-free regions that do not contain lithium (Li) metal or a Li alloy in the initial state or after discharge of the solid secondary battery.

Referring to FIG. 13, a solid secondary battery 1 according to an embodiment has a structure in which the second anode active material layer 23 is disposed on the cathode current collector 21, and the solid electrolyte 30 is directly disposed on the second anode active material layer 23. The second anode active material layer 23 is, for example, a lithium metal layer or a lithium alloy layer. As the solid electrolyte of the solid secondary battery, the composite solid electrolyte according to embodiments and an additional solid electrolyte may be used together.

The additional solid electrolyte may be for example, an oxide-based solid electrolyte, a sulfide-based solid electrolyte, or a combination thereof.

A material of the sulfide-based solid electrolyte may be, for example, $Li_2S$—$P_2S_5$, $Li_2S$—$P_2S_5$—LiX (wherein X is a halogen element, for example, I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are each a positive number, and Z is one of Ge, Zn, and Ga), $Li_2S$—$GeS_2$, $Li_2S$—$SiS_2$—$Li_3PO_4$, $Li_2S$—$SiS_2$—$Li_pMO_q$ (wherein p and q are each a positive number, and M is one of P, Si, Ge, B, Al, Ga, and In), or the like. The material of the sulfide-based solid electrolyte is prepared by treatment of a starting material (for example, $Li_2S$, $P_2S_5$, or the like) using a melt quenching method or a mechanical milling method. This treatment may be followed by heat treatment. The solid electrolyte may be amorphous, crystalline, or in a mixed state thereof.

As the additional solid electrolyte, among the above-listed sulfide-based solid electrolyte materials, a sulfide-based solid electrolyte material including at least sulfur (S), phosphorus (P), and lithium (Li) may be used. For example, a sulfide-based solid electrolyte material including $Li_2S$—$P_2S_5$ may be used. When a sulfide-based solid electrolyte material including $Li_2S$—$P_2S_5$ is used as a material constituting the solid electrolyte, a mixing molar ratio of $Li_2S$ and $P_2S_5$ may be selected to be within a range of, for example, $Li_2S:P_2S_5$=50:50 to 90:10.

Hereinafter, the present disclosure will be described in more detail through the following examples and comparative examples. However, the following examples are set forth to illustrate the present disclosure, and the scope of the present disclosure is not limited thereto.

EXAMPLES

Preparation of halide Solid Electrolyte as First Solid Electrolyte

Preparation Example 1

LiOH (moisture content: 3.43 wt %) and $GaF_3$ were mixed in a molar ratio of 2:1 to obtain a mixture, and this mixture was subject to high-energy milling for 10 minutes using a Pulverisette 7 Premium line mixer after performing ball milling at a speed of 700 rpm for 18 hours. After the high-energy milling, the mixture was left to stand for 5 minutes for cooling (1 cycle). The high-energy milling and standing processes were repeatedly carried out for 72 cycles in total to obtain a compound in clay form having the composition as shown in Table 1. The compound in clay form was used as a halide solid electrolyte.

Preparation Examples 2 and 3

Compounds having the compositions as shown in Table 1 were obtained in clay form, according to the same method as in Preparation Example 1, except that the molar ratio of LiCl and $GaF_3$ was changed to 3:1 and 4:1, respectively.

Preparation Example 4

A compound having the composition as shown in Table 1 was obtained in clay form, according to the same method as in Preparation Example 2, except that LiBr was used instead of LiCl.

Preparation Example 5

A compound having the composition as shown in Table 1 was obtained in clay form, according to the same method as in Preparation Example 1, except that LiCl, LiOH, and $GaF_3$ were used, instead of LiCl and $GaF_3$, in a molar ratio 2:1:1.

Preparation Example 6

A compound having the composition as shown in Table 1 was prepared in clay form, according to the same method as in Preparation Example 1, except that LiCl, $LaCl_3$, and $GaF_3$ were used, instead of LiCl and $GaF_3$, in a molar ratio 3:0.1:0.9.

Preparation Example 7

A compound having the composition as shown in Table 1 was prepared in clay form, according to the same method as in Preparation Example 1, except that LiCl, $InCl_3$, and $GaF_3$ were used, instead of LiCl and $GaF_3$, in a molar ratio 3:0.1:0.9.

Preparation Example 8

LiCl (moisture content: 3.43 wt %) was dried in a 180° C. vacuum oven for 12 hours. A compound having the composition as shown in Table 1 was obtained in clay form, according to the same method as in Preparation Example 1.

TABLE 1

| Example | Composition |
| --- | --- |
| Preparation Example 1 | $2LiCl$-$GaF_3$ |
| Preparation Example 2 | $3LiCl$-$GaF_3$ |
| Preparation Example 3 | $4LiCl$-$GaF_3$ |
| Preparation Example 4 | $3LiBr$-$GaF_3$ |
| Preparation Example 5 | $2LiCl$-$LiOH$-$GaF3$ |
| Preparation Example 6 | $3LiCl$-$0.1LaCl_3$-$0.9GaF_3$ |
| Preparation Example 7 | $3LiCl$-$0.1InCl_3$-$0.9GaF_3$ |
| Preparation Example 8 | $2LiCl$-$GaF_3$ |

Preparation of Composite Solid Electrolyte and Solid Secondary Battery

Example 1

To 15 milliliters (mL) (15 g) of deionized water, 2.7 grams (g) of a mixed powder of LiOH and $H_3BO_3$ (corresponding to 18 wt % of the deionized water) was added to prepare an aqueous solution of 15.2 wt % of LiOH and $H_3BO_3$ (a molar ratio of LiOH and $H_3BO_3$=3:11), and then a 1 wt % carboxymethyl cellulose (CMC) aqueous solution was added thereto to prepare a composition for forming a lithium ion-conductive interlayer.

The composition for forming a lithium ion-conductive interlayer was spin-coated on the surface of $Li_{6.5}La_3Zr_{1.5}Ta_{0.5}O_{12}$ (LLZO) used as a secondary solid electrolyte, using a SPIN-1200D system (MIDAS SYSTEM CO., LTD) at 5000 rpm for 30 seconds. After the spin coating, heat treatment at 280° C. for 15 minutes, and heat treatment at 500° C. in the atmospheric condition for 1 hour were performed to form the lithium ion-conductive interlayer on the second solid electrolyte. The lithium ion-conductive interlayer contained $Li_{2.2}C_{0.8}B_{0.2}O_3$ as a lithium ion-conductive compound.

The halide solid electrolyte containing the compound of Preparation Example 1 was stacked as a first solid electrolyte on the lithium ion-conductive interlayer to prepare a composite solid electrolyte having a total thickness of 617 um, the composite solid electrolyte including the second solid electrolyte/lithium ion-conductive interlayer/first solid electrolyte. Here, the thickness of the halide solid electrolyte as the first solid electrolyte was 115 urn, the thickness of the lithium ion-conductive interlayer was 2 um, and the thickness of the LLZO film as the second solid electrolyte was 500 um.

Firstly, a cathode was manufactured according to the following process.

$LiNi_{0.8}Co_{0.15}Mn_{0.05}O_2$ (NCM), a conductive agent (Super-P, Timcal Ltd.), polyvinylidene fluoride (PVDF), and N-methylpyrrolidone were mixed to obtain a composition for forming a cathode active material layer. In the composition for forming a cathode active layer, the mixed weight ratio of NCM, conductive agent, and PVDF was 97:1.5:1.5, and the amount of N-methylpyrrolidone was about 137 g with respect to 97 g of NCM.

The composition for forming a cathode active material layer was coated on an aluminum foil (thickness: about 15 μm) and dried at 25° C., and then the dried product was dried in a vacuum at about 110° C. to manufacture a cathode.

A lithium metal anode (thickness: about 20 μm) was arranged on a current collector (copper foil), and the cathode was arranged on the lithium metal anode to prepare a battery laminate.

The battery laminate was combined according to a cold isostatic pressing (CIP) method at about 250 MPa for 3 minutes to manufacture a solid secondary battery.

The solid secondary battery had the cathode containing a halide solid electrolyte containing the compound of Preparation Example 1, the composite solid electrolyte of Example 1, and the lithium anode. The halide solid electrolyte contained in the cathode is a product obtained by diffusion of the halide solid electrolyte of the composite solid electrolyte into the cathode when the cathode/composite solid electrolyte/anode was pressed.

Examples 2-7

Composite solid electrolytes and solid secondary batteries were manufactured according to the same methods as in Example 1, except that the halide solid electrolytes containing the compounds of Preparation Examples 2 to 7 were used, respectively, instead of the halide solid electrolyte containing the compound of Preparation Example 1.

Examples 8-15

Composite solid electrolytes and solid secondary batteries were manufactured according to the same methods as in Example 1, except that LiF, $Li_2SO_4$, $Li_3AsO_4$, $Li_2CO_3$, $Li_3PO_4$, LiCl, $Li_4VO_4F$, and $Li_3VO_4$ were used, respectively, instead of $Li_{2+x}C_{1-x}B_xO_3$, to form the lithium ion-conductive interlayers.

Examples 9-18

Composite solid electrolytes and solid secondary batteries were manufactured according to the same methods as in Example 1, except that the amounts of LiOH, $H_3BO_3$, and CMC in the compositions for forming the lithium ion-conductive interlayers were stoichiometrically selected to obtain the lithium ion-conductive interlayers containing $Li_{2.1}C_{0.9}B_{0.1}O_3$, $Li_{2.175}C_{0.825}B_{0.175}O_3$, $Li_{2.5}C_{0.75}B_{0.25}O_3$, $Li_{2.275}C_{0.725}B_{0.275}O_3$, $Li_{2.3}C_{0.7}B_{0.3}O_3$, $Li_{2.5}C_{0.65}B_{0.35}O_3$, $Li_{2.375}C_{0.625}B_{0.375}O_3$, $Li_{2.4}C_{0.6}B_{0.4}O_3$, $Li_{2.5}C_{0.5}B_{0.5}O_3$, or $Li_{2.575}C_{0.425}B_{0.575}O_3$, respectively, instead of $Li_{2.2}C_{0.8}B_{0.2}O_3$.

Reference Example 1

A composite solid electrolyte and a solid secondary battery were manufactured, in which the composite solid electrolyte including a second solid electrolyte/first solid electrolyte was prepared by stacking the solid electrolyte containing the compound of Preparation Example 1, as used in Example 1, on a LLZO ($Li_{6.5}La_3Zr_{1.5}Ta_{0.5}O_{12}$) film used as a second solid electrolyte.

Reference Example 2

A composite solid electrolyte and a solid secondary battery were manufactured in the same manner as in Example 1, except that a sulfide-based solid electrolyte $LiPS_5Cl$ was used, instead of the LLZO solid electrolyte, as the second solid electrolyte.

Evaluation Example 1: XRD Analysis

Figure 2A:
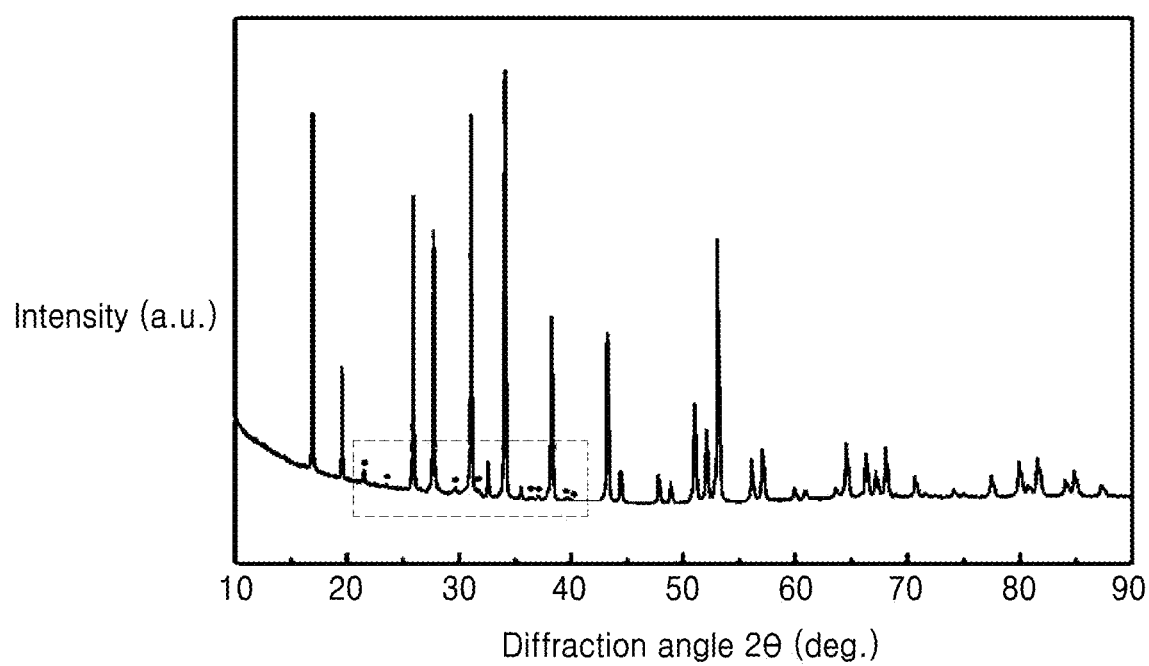
FIG. 2A is a graph of intensity (arbitrary units, a.u.) versus diffraction angle (degrees 2θ) and shows the results of X-ray diffraction analysis of a lithium ion-conductive interlayer/LLZO film of Example 1.
Figure 2B:
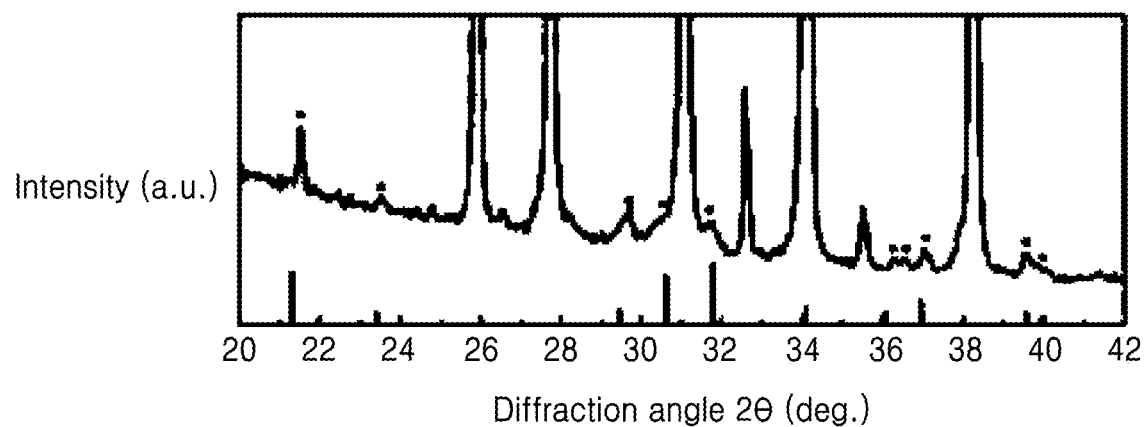
FIG. 2B is an enlarged view of a region of FIG. 2A.

X-ray powder diffraction (XRD) spectra of the lithium ion-conductive interlayer/LLZO film of Example 1 were obtained. The results are shown in FIGS. 2A and 2B. Cu Kα radiation was used in the XRD measurement, and the XRD analysis was performed using Bruker D8 Advance.

Referring to FIG. 2A, it was found that the lithium ion-conductive interlayer of Example 1 consisted of Li, C, B, and O with the composition of $Li_{2+x}C_{1-x}B_xO_3$ having the same crystal structure of $Li_2CO_3$.

Evaluation Example 2: SEM

Figure 3A:
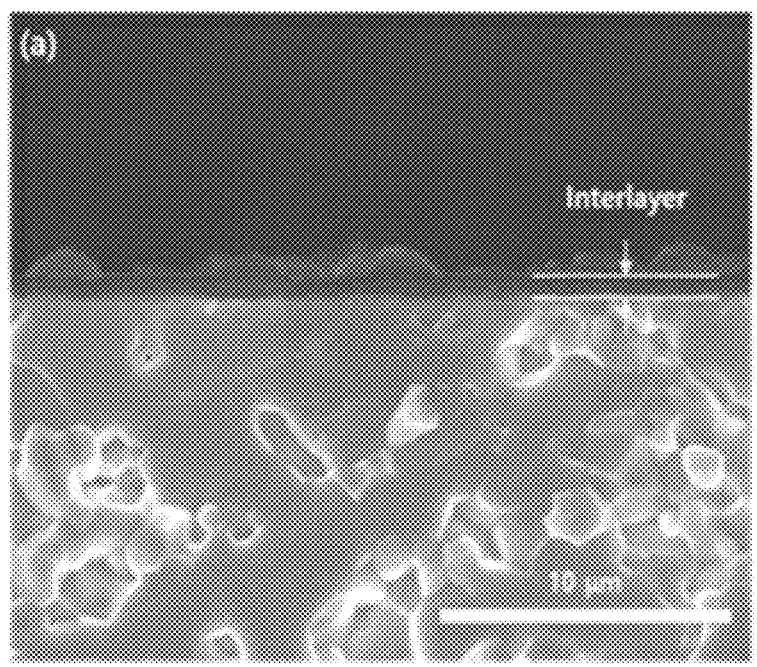
FIG. 3A shows results of scanning electron microscopy (SEM) analysis of a cross-section of a composite solid electrolyte of Example 1.
Figure 3B:
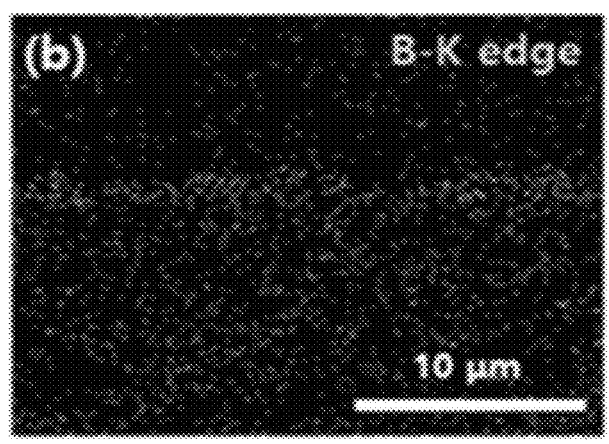
FIGS. 3B to 3E show the results of energy-dispersive X-ray spectroscopy (EDS) analysis of a cross-section of a lithium ion-conductive interlayer of the composite solid electrolyte of Example 1.
Figure 3C:
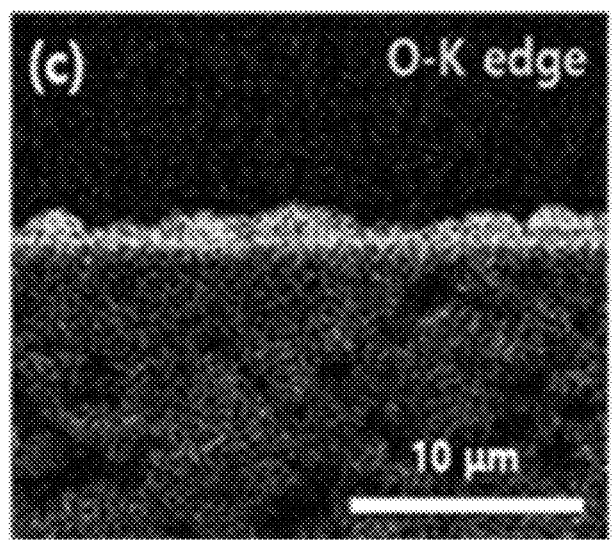
Figure 3D:
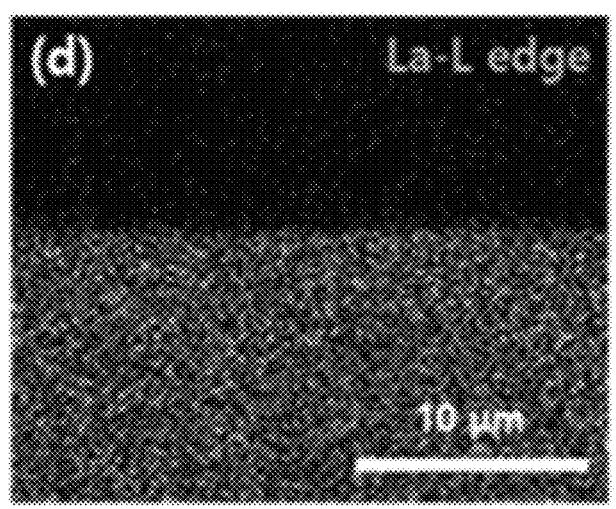
Figure 3E:
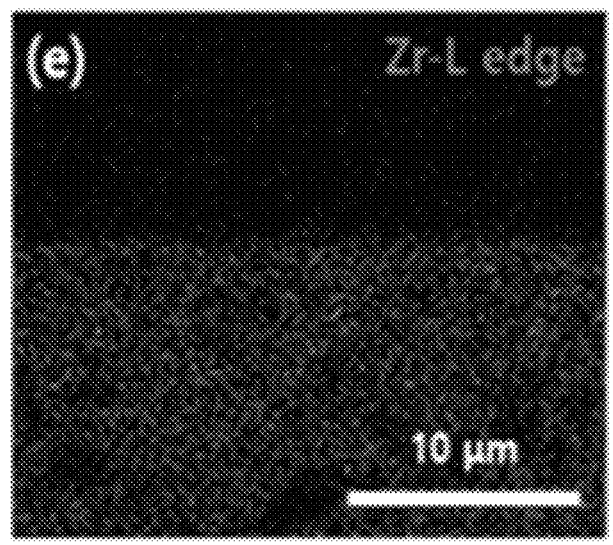

A cross-section of the lithium ion-conductive interlayer of Example 1 was analyzed by SEM. For the SEM analysis, a Hitachi SU 8030 FE-SEM was used. The SEM analysis results are shown in FIGS. 3A and 3B. FIG. 3A shows the results of the SEM analysis of a cross-section of the composite solid electrolyte of Example 1, and FIGS. 3B to 3E show energy-dispersive X-ray spectroscopy (EDS) images of the cross-section of the interlayer of the composite solid electrolyte of Example 1.

Referring to FIGS. 3A and 3B, it was found that the lithium ion-conductive interlayer was formed at a thickness of about 2-3 μm between the LLZO film and the first solid electrolyte. In addition, as shown in FIGS. 3B to 3E, it was found that the first solid electrolyte and the second solid electrolyte were formed with the lithium ion-conductive interlayer therebetween, and the first solid electrolyte and the LLZO solid electrolyte as the second solid electrolyte had a close interfacial state and excellent binding state.

Evaluation Example 3: Scanning Electron Microscopy and Energy-Dispersive X-Ray Spectroscopy (SEM-EDS) Analysis The secondary batteries of Example 1 and Reference Examples 1 and 2 were analyzed by SEM-EDS to determine the interfacial states of the cathode, solid electrolyte (SE), and LLZO solid electrolyte, and the distribution state of the solid electrolytes in the cathode. For the SEM-EDS analysis, a Hitachi SU 8030 FE-SEM was used.

A test of 50 charge-discharge cycles was performed on each of the solid secondary batteries according to the following conditions.

Each of the solid secondary batteries was put into a 60° C. thermostat to perform the test. The solid secondary battery was charged with a constant current of 0.1 C for 10 hours until a battery voltage of 4.2 V was reached, and was then discharged with a constant current of 0.1 C for 20 hours until a battery voltage of 2.85 V was reached (first cycle). A C rate means a current which will discharge a battery in one hour, e.g., a C rate for a battery having a discharge capacity of 1.6 ampere-hours would be 1.6 amperes.

After the first charge-discharge cycle, the charge-discharge was repeatedly performed 50 times in total.

Figure 5A:
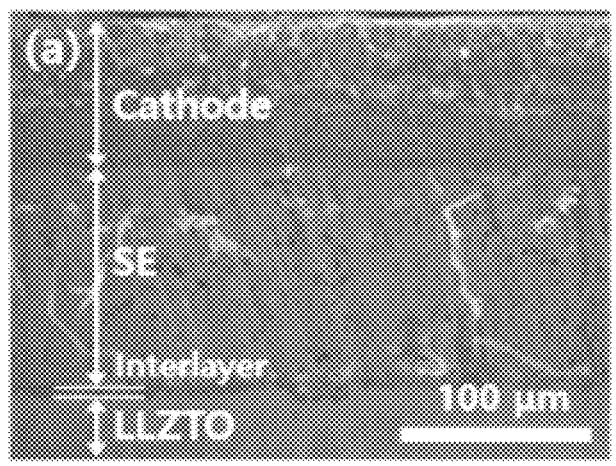
FIG. 5A shows an SEM image showing a cross-sectional view of a cathode/first solid electrolyte/interlayer/second solid electrolyte assembly in a solid secondary battery of Example 1.
Figure 5B:
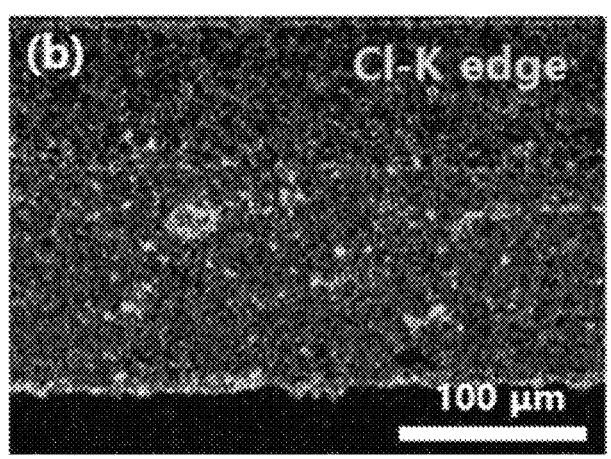
FIGS. 5B to 5F show EDS images of a Cl—K edge, a Ga-L edge, a Ni—K edge, a Zr-L edge, and an O—K edge in the solid secondary battery of Example 1, respectively.
Figure 5C:
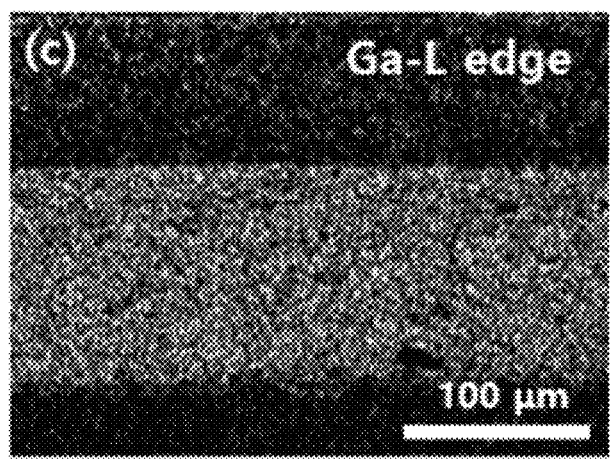
Figure 5D:
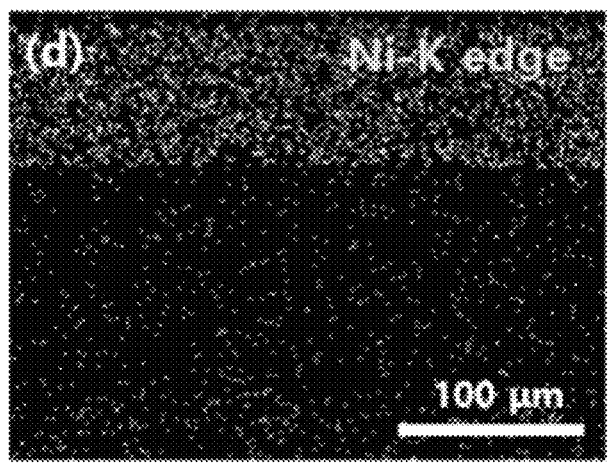
Figure 5E:
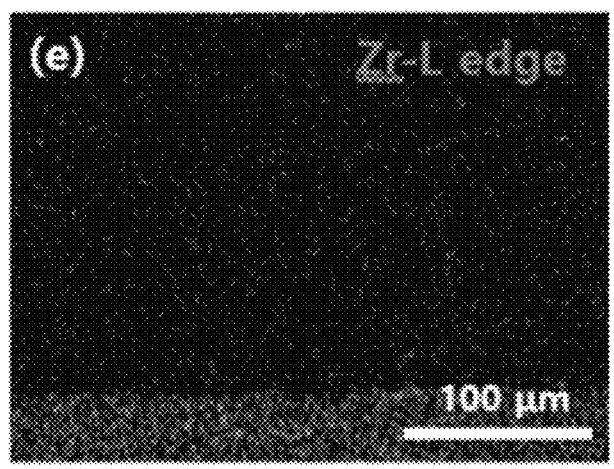
Figure 5F:
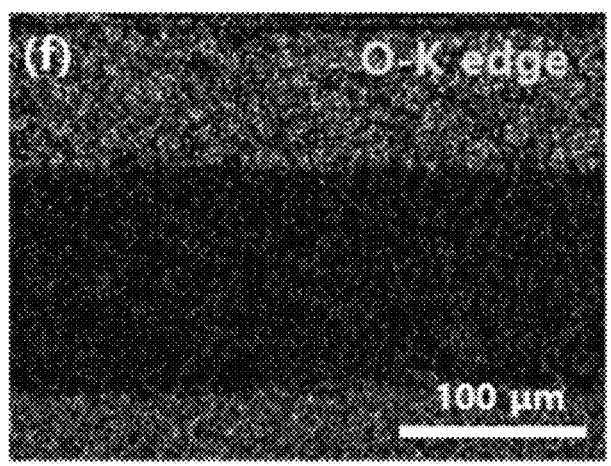

The analysis results are as shown in FIGS. 5A to 5F. FIG. 5A is an SEM image showing a cross-section of the cathode/first solid electrolyte/second solid electrolyte, and FIGS. 5B, 5C, 5D, 5E, and 5F are EDS images of a Cl—K edge, a Ga-L edge, a Ni—K edge, a Zr-L edge, and an O—K edge, respectively.

As shown in FIG. 5, it was found that in the solid secondary battery of Example 1, stable contact between LLZO and the solid electrolyte was maintained. As shown in FIGS. 5B, 5C, 5D, 5E, and 5F, reduced detection amounts of Cl and Ga in LLZO indicate an effect that inhibits chemical diffusion of Ga and Cl into the LLZO film.

Also, the interlayer of the composite solid electrolyte manufactured in Reference Example 2 was found not to be effective in suppressing a side reaction of the halide solid electrolyte and the sulfide-based solid electrolyte. In addition, it was found that in the solid electrolyte of Reference Example 1, halide anions such as Cl$^-$ and/or gallium cations in the halide solid electrolyte partially permeate into the oxide-based solid electrolyte.

Evaluation Example 4: X-Ray Photoelectron Spectroscopy (XPS)

Figure 4A:
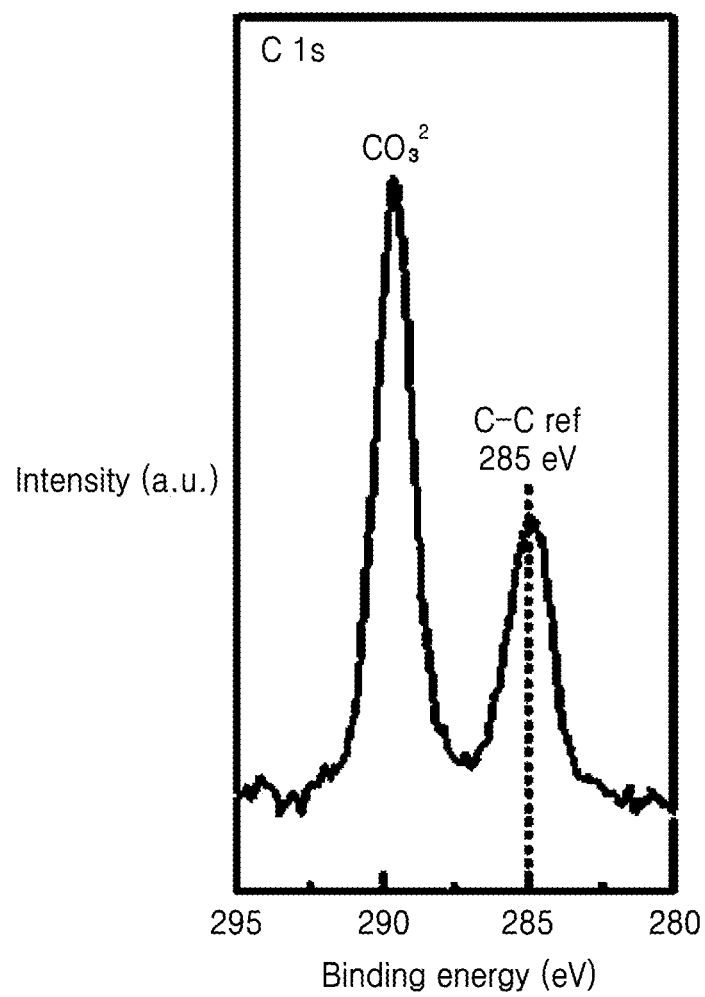
FIGS. 4A to 4C are each a graph of intensity (arbitrary units, a.u.) versus binding energy (electron volts, eV) and show the results of X-ray photoelectron spectroscopy (XPS) analysis for C 1s, Li 1s, and B 1s of a lithium ion-conductive compound for forming the lithium ion-conductive interlayer of Example 1.
Figure 4B:
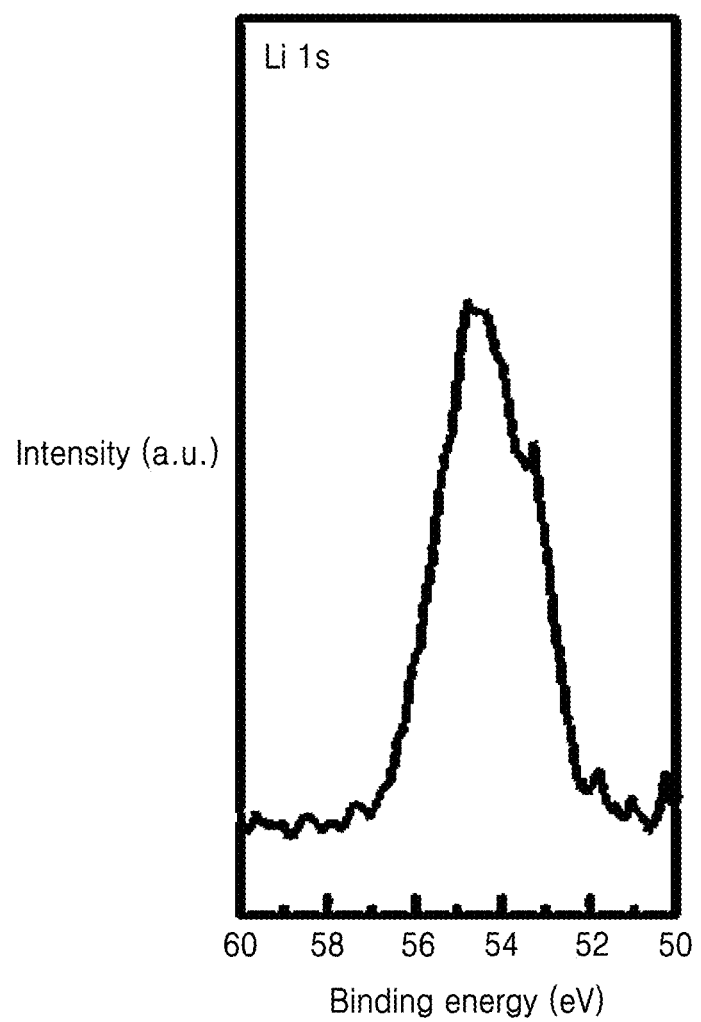
Figure 4C:
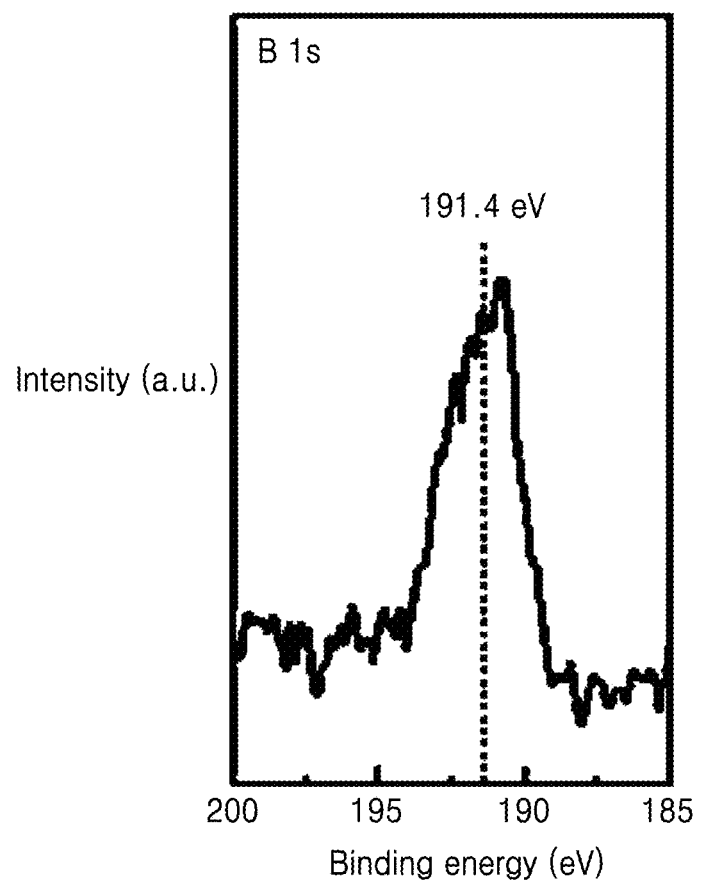

Binding energies of the lithium ion-conductive interlayer of Example 1 were measured with an X-ray photoelectron spectrometer (Thermo Fisher Scientific, Multilab-2000). The analysis results are shown in FIGS. 4A to 4C. FIGS. 4A to 4C show the results of XPS analysis of C 1s, Li 1s, and B 1s which are materials forming the interlayer.

Referring to FIGS. 4A to 4C, it was found that according to Example 1, the lithium ion-conductive interlayer having the composition of $Li_{2+x}C_{1-x}B_xO_3$ was formed.

Evaluation Example 5: Interfacial Resistance

After charging and discharging the solid secondary batteries manufactured in Example 1 and Reference 1, interfacial resistance was measured.

The solid secondary battery of Example 1 was charged and discharged at a rate of 0.6 mA/cm$^2$ at 60° C. in a voltage range of 2.85 V to 4.2 V. In further detail, the solid secondary battery was charged with a constant current of about 0.2 C for 5 hours until a battery voltage of 4.2 V was reached, and was then discharged with a constant current of about 0.2 C for 5 hours until a battery voltage of 2.85 V was reached.

Figure 6A:
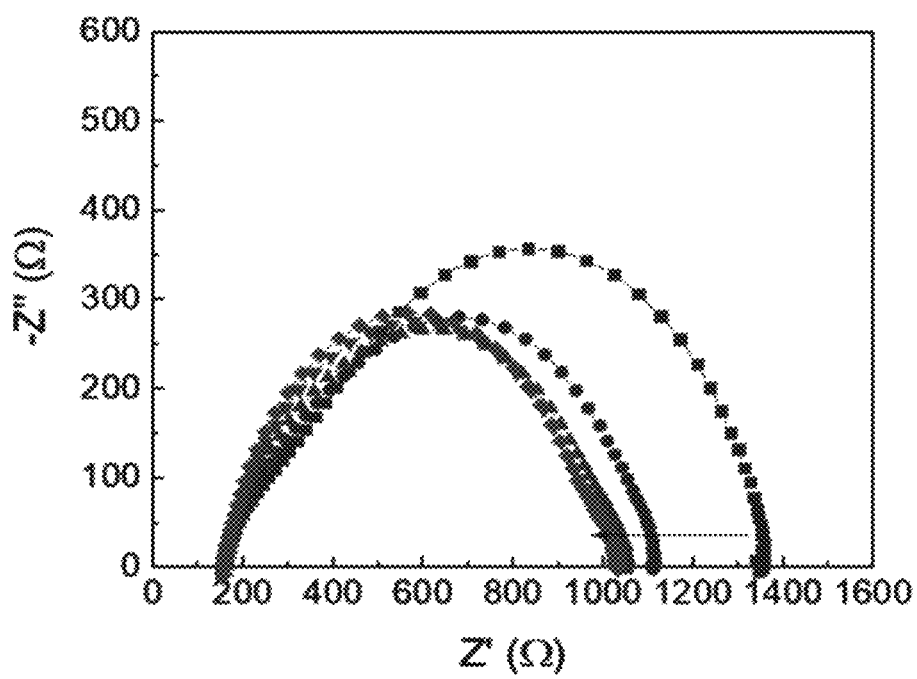
FIGS. 6A and 6B are each a graph of imaginary resistance (−Z", ohms (Ω)) versus real resistance (Z', ohms (Ω)) and show the interfacial resistance characteristics of the solid secondary battery of Example 1 when charged and discharged, respectively.
Figure 6B:
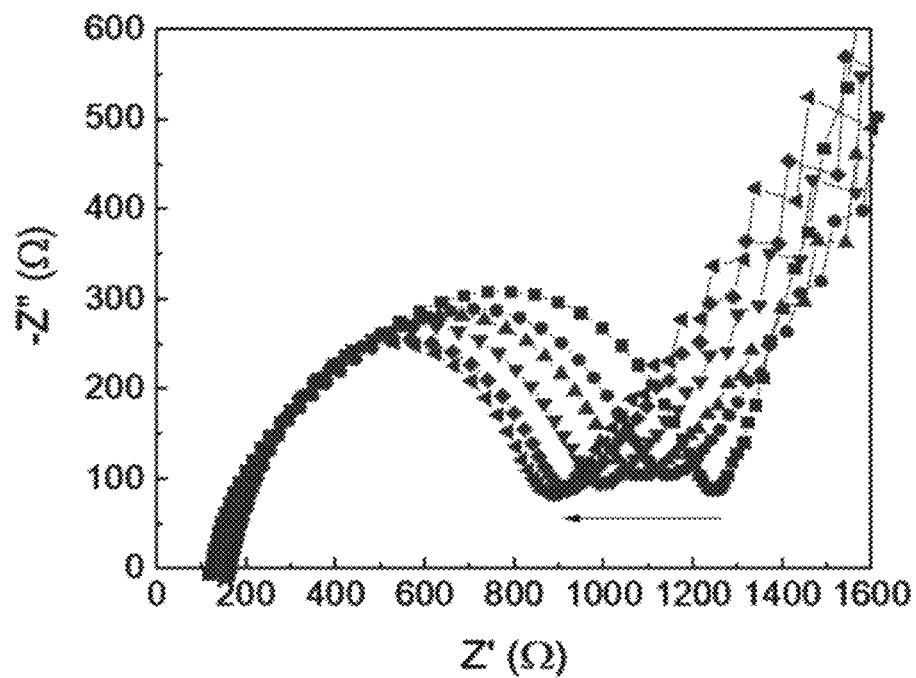
Figure 7A:
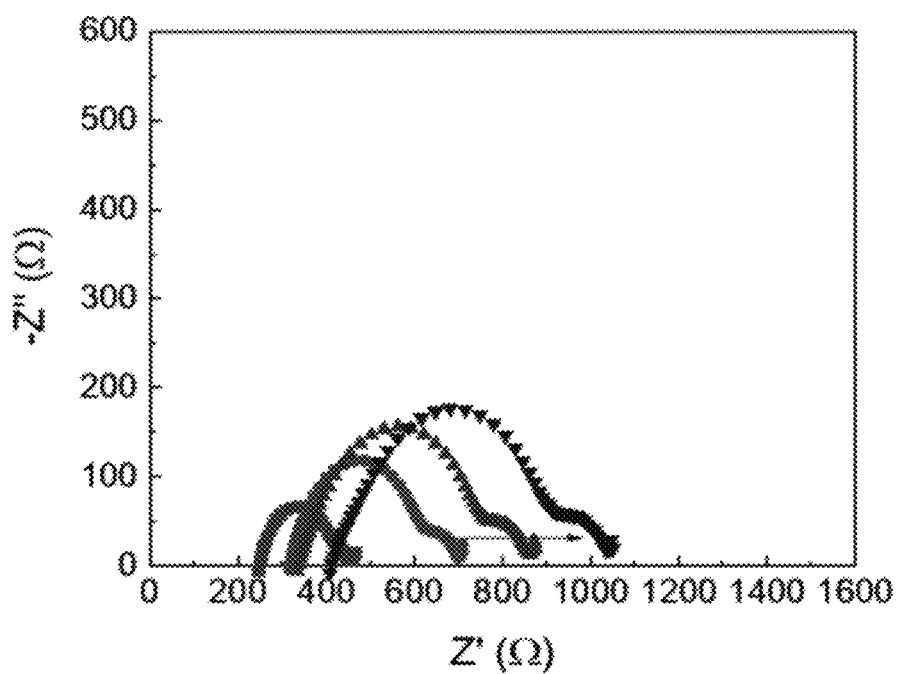
FIGS. 7A and 7B are each a graph of imaginary resistance (−Z", ohms (Ω)) versus real resistance (Z', ohms (Ω)) and show the interfacial resistance characteristics of a solid secondary battery of Reference Example 1, respectively.
Figure 7B:
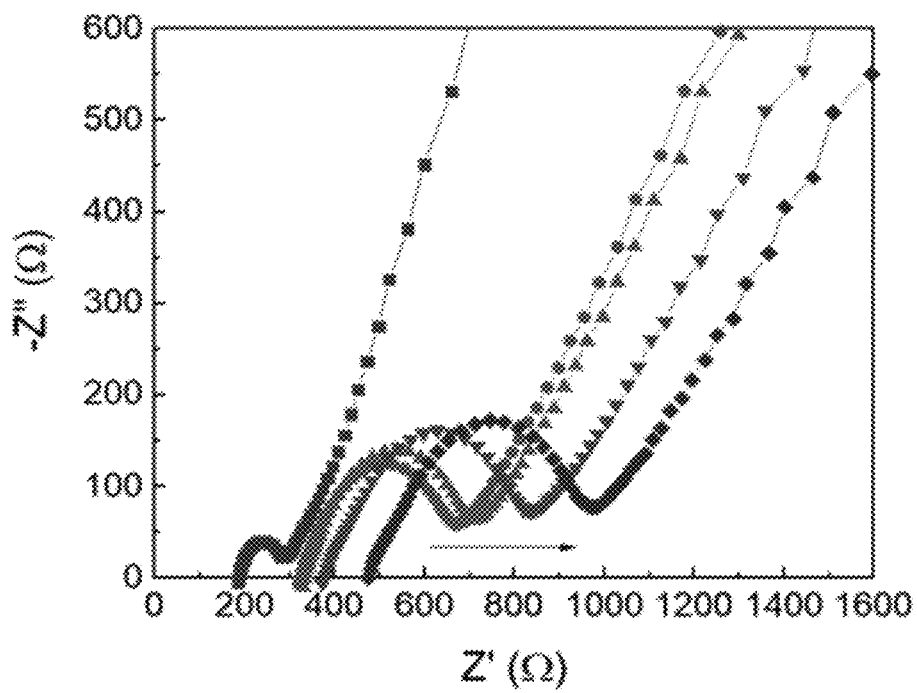

The interfacial resistance characteristics of the solid secondary battery of Example 1 after the 1st to 5th cycles of charging and discharging are as shown in FIGS. 6A and 6B, the interfacial resistance characteristics of the solid secondary battery of Reference Example 1 after the 1st to 5th cycles of charging and discharging are as shown in FIGS. 7A and 7B. In FIGS. 6A, 6B, 7A, and 7B, the arrow indicates the direction of progress of the cycles.

Referring to FIGS. 6A, 6B, 7A, and 7B, it was found that in the solid secondary battery of Example 1, a resistance increase phenomenon during operation is suppressed, as compared with the solid secondary battery of Reference Example 1.

Evaluation Example 6: Charge-Discharge Profile, and Change in Battery Voltage Per Change in Capacity (dV/dQ)

The solid secondary battery of Example 1 and the solid secondary battery of Reference Example 1 were charged and discharged at a current rate of 0.6 mA/cm$^2$ at 60° C. and a voltage range of 2.85 to 4.2 V, which are the same conditions as the evaluation method of Evaluation Example 5. The charge-discharge cycle characteristics of the solid secondary batteries were evaluated in a 60° C.-thermostat.

In further detail, each solid secondary battery was charged with a constant current of 0.2 C for 5 hours until a battery voltage of 4.2 V was reached, and was then discharged with a constant current of 0.2 C for 5 hours until a battery voltage of 2.85 V was reached (first cycle). This cycle was repeatedly performed 50 cycles in total.

Figure 8A:
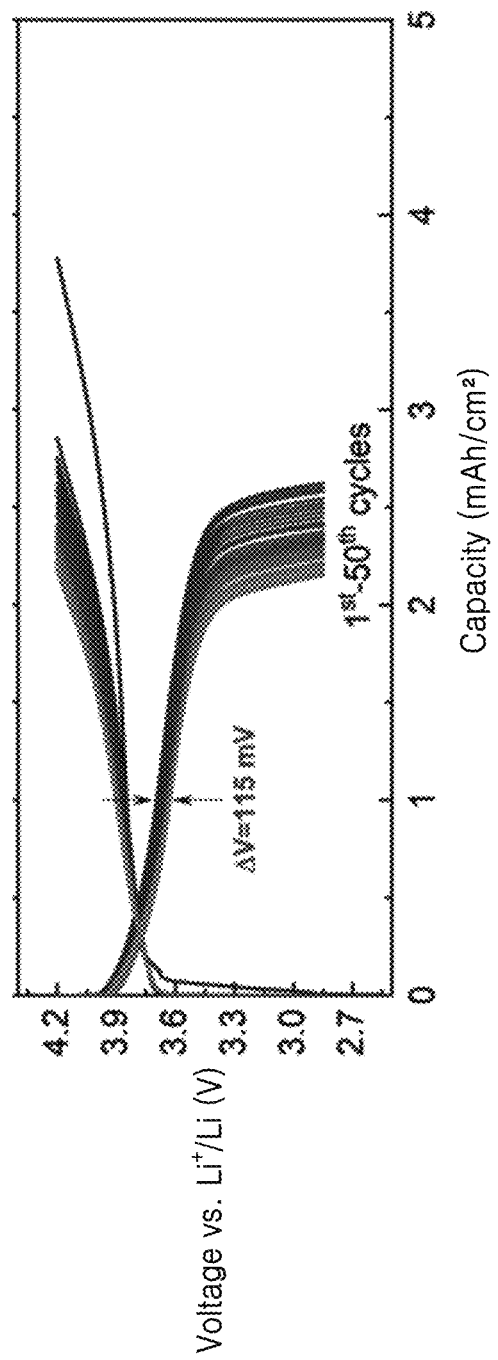
FIGS. 8A and 8B are each a graph of voltage (volts (V) versus Li$^+$/Li) and show voltage profiles and cycle characteristics of the solid secondary batteries of Example 1 and Reference Example 1, respectively.
Figure 8B:
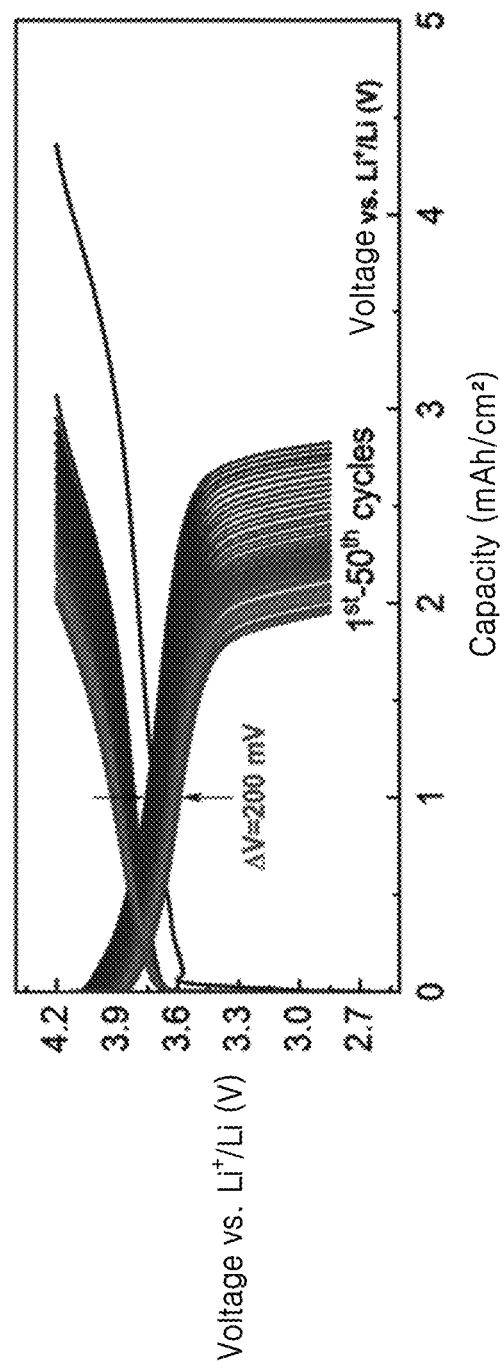
Figure 9A:
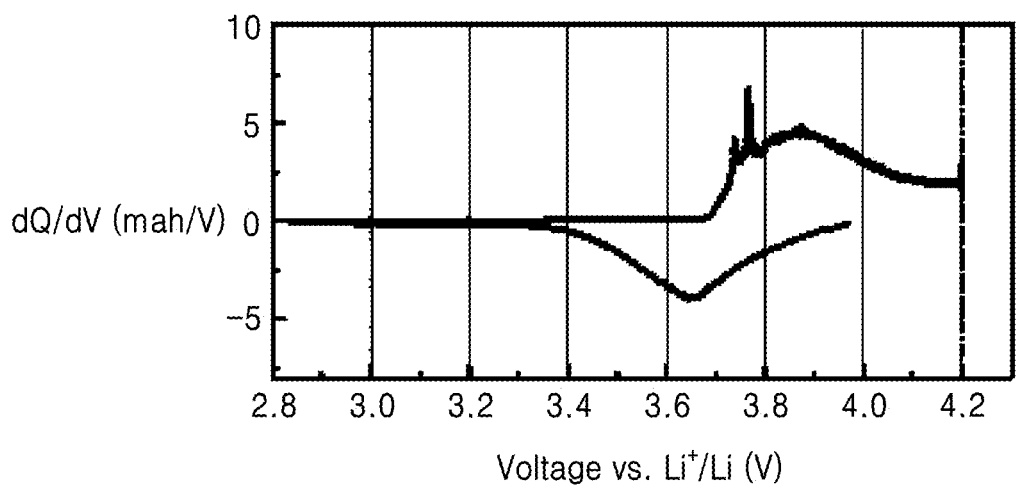
FIGS. 9A and 9B are each a graph of change in battery voltage (dV/dQ) with respect to change in charge capacity versus voltage (volts (V) versus Li$^+$/Li) for the solid secondary batteries of Example 1 and Reference Example 1, respectively.
Figure 9B:
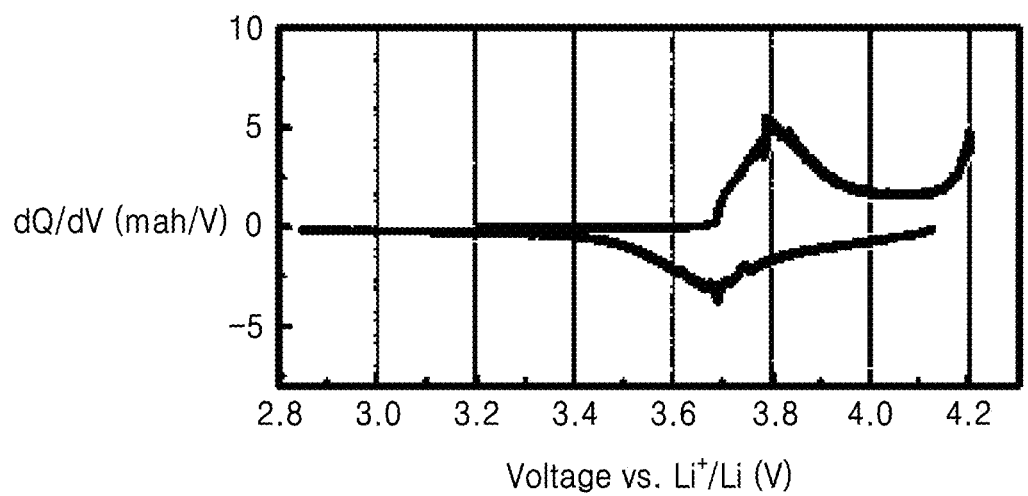

Voltage profiles of the solid secondary batteries of Example 1 and Reference Example 1 after the 1st to 50 cycles of charging and discharging are shown in FIGS. 8A and 8B, respectively, and changes in battery voltage per change in capacity (dV/dQ) are shown in FIG. 9A and FIG. 9B, respectively. Here, a value of change in battery voltage per change in capacity (dV/dQ) is calculated by differentiating a voltage (V) with respect to a charge storage (Q) corresponding thereto.

From the results of FIGS. 8A and 9A, it was found that the solid secondary battery of Example 1 had excellent usability as a solid electrolyte because diffusion of halogen from the first solid electrolyte to the LLZO electrolyte was prevented.

Also, as is known from FIGS. 8B and 9B, the solid secondary battery of Reference Example 1 exhibited a greater amount of side reaction near voltage 2 V and at the same time, inferior lifespan characteristics, as compared with those of the solid secondary battery of Example 1.

Evaluation Example 7: Lifespan Characteristics

The solid secondary battery of Example 1 and the solid secondary battery of Reference Example 1 were charged and discharged at a current rate of 0.6 mA/cm$^2$ at 60° C. and a voltage range of 2.85 to 4.2 V, which are the same conditions as the evaluation method of Evaluation Example 5.

The cycle characteristics of the solid secondary batteries were evaluated in a 60° C.-thermostat.

In further detail, each solid secondary battery was charged with a constant current of 0.2 C for 5 hours until a battery voltage of 4.2 V was reached, and was then discharged with a constant current of 0.2 C for 5 hours until a battery voltage of 2.85 V was reached (first cycle). This cycle was repeatedly performed 50 cycles in total.

Figure 10A:
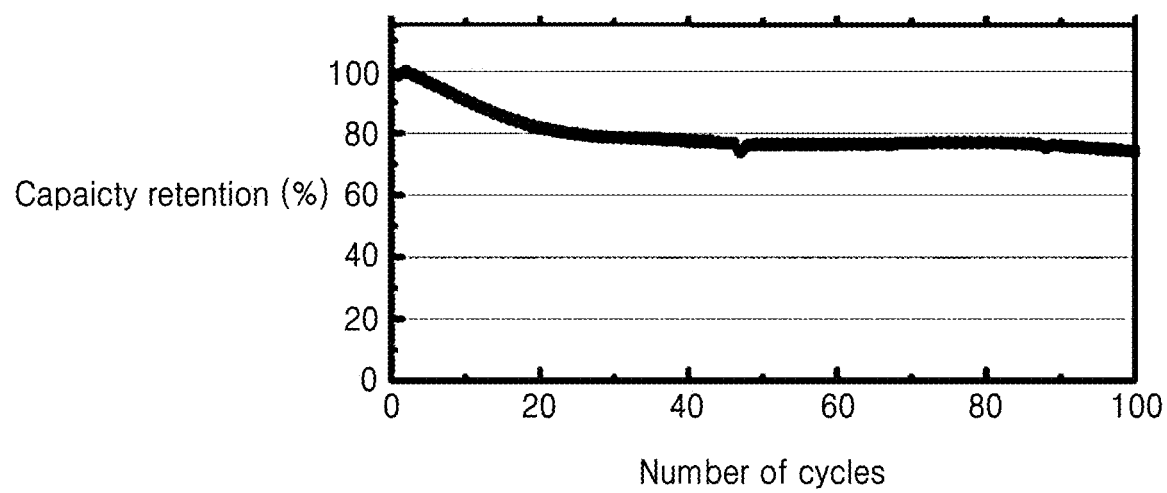
FIGS. 10A and 10B are each graph of capacity retention (percent, %) versus number of cycles showing the lifespan characteristics of the solid secondary batteries of Example 1 and Reference Example 1, respectively.
Figure 10B:
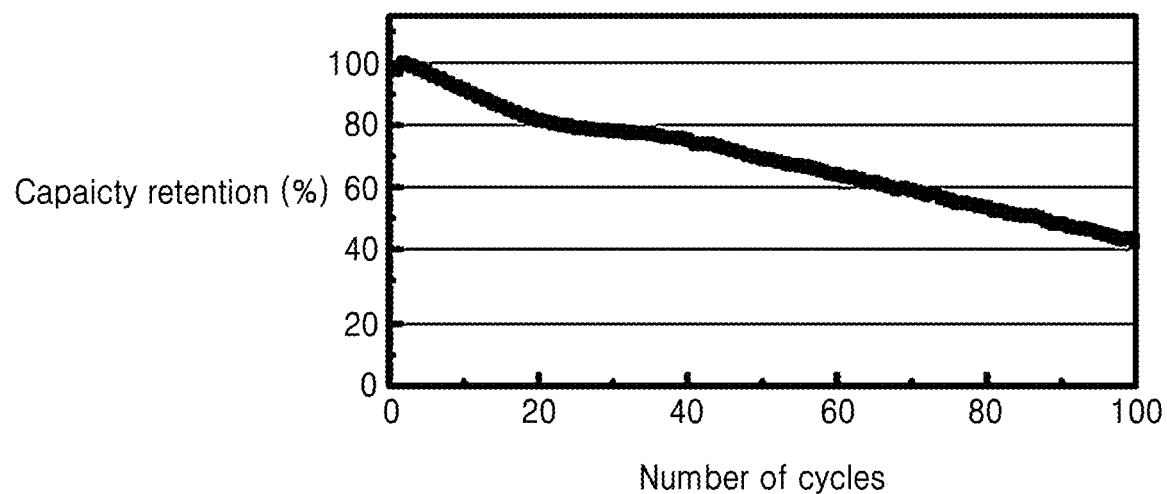

The lifespan characteristics of the solid secondary batteries of Example 1 and Reference Example 1 after the 1st to 50th cycles of charging and discharging were performed are shown in FIGS. 10A and 10B, respectively.

The solid secondary battery of Reference Example 1 had a capacity retention of 40% after the 100th cycle as shown in FIG. 10B, while the solid secondary battery of Example exhibited an improved capacity retention of 80% after the 100th cycle as shown in FIG. 10A. From these results, it was found that by the introduction of the lithium ion-conductive interlayer, the lifespan characteristic was greatly improved as compared with that of the solid secondary battery of Reference Example 1.

Evaluation Example 8: Reaction Energy

The thermodynamic stabilities of the first solid electrolyte ($3LiCl-GaF_3$) and the second solid electrolyte ($Li_{6.5}La_3Zr_{1.5}Ta_{0.5}O_2$) with respect to the compound used to form the lithium ion-conductive interlayer (hereinafter, also referred to as the interlayer) were evaluated by comparison through DFT calculation with the Vienna ab initio simulation package (VASP).

The reaction energy (E1) of the lithium ion-conductive interlayer to the first solid electrolyte and the reaction energy (E2) of the lithium ion-conductive interlayer to the second solid electrolyte are represented by Equations 1 and 2, respectively.

$E1$=(Thermodynamic energy of reaction product of the first solid electrolyte and the lithium ion-conductive interlayer)−(Thermodynamic energy of the first solid electrolyte (reaction product 1)+Thermodynamic energy of the lithium ion-conductive interlayer (reaction product 2))  Equation 1

$E2$=(Thermodynamic energy of reaction product of the second solid electrolyte and the lithium ion-conductive interlayer)−(Thermodynamic energy of the second solid electrolyte (reaction product 3)+Thermodynamic energy of the lithium ion-conductive interlayer (reaction product 2))  Equation 2

The evaluation results are shown in Table 2.

TABLE 2

| Composition | Reaction energy (E1) of first solid secondary to lithium ion-conductive interlayer (meV/atm) | Reaction energy (E2) of second solid electrolyte to lithium ion-conductive interlayer (meV/atm) |
| --- | --- | --- |
| $Li_{2.2}C_{0.8}B_{0.2}O_3$ | −41 | 0 |
| LiF | 0 | 0 |
| $Li_2SO_4$ | 0 | 0 |
| $Li_3AsO_4$ | −6 | 0 |
| $Li_2CO_3$ | −3.1 | 0 |
| $Li_3PO_4$ | −7 | 0 |
| LiCl | −9 | 0 |
| $Li_4VO_4F$ | −14 | 0 |
| $Li_3VO_4$ | −16 | 0 |

For the lithium ion-conductive interlayer formation materials having the compositions as shown in Table 2, the reaction energy to the first solid electrolyte exhibited a value of −50 meV/atom or greater, and thus it was found that due to the reduced reactivity to the first solid electrolyte, the materials are very useful to form the lithium ion-conductive interlayer. In addition, the reaction energy (E2) of the lithium ion-conductive interlayer to the second solid electrolyte is zero as shown in Table 2, which means the lithium ion-conductive interlayers containing these compositions substantially do not have reactivity to the second solid electrolyte.

Evaluation Example 2: Measurement of Ion Conductivity and Activation Energy 0.2 g of each of the compounds in clay form of Preparation Examples 1 to 8 was placed between SUS plates each having a diameter of 16 millimeters (mm) and a thickness of 500 um, in the form of SUS/composition/SUS, and then 100 kilograms (kg) to 200 kg of uniaxial pressure was applied thereto for 10 seconds to manufacture a SUS/compound pellet/SUS structure in a circular form. The resistance of each SUS/compound pellet/SUS structure was measured in a temperature range of −20° C. to 80° C. with a 10 mV AC from 1 MHz to 0.01 Hz with respect to an open circuit voltage, by using a potentio-static impedance measurement method.

The total resistance (Rtotal) value was obtained from the impedance results, and the ionic conductivity was calculated from this value with corrections of the electrode area and the compound pellet thickness.

The ionic conductivities obtained according to the above processes are shown in Table 3.

TABLE 3

| Example | Composition | Ionic conductivity (@ RT, mS/cm) |
| --- | --- | --- |
| Preparation Example 1 | $2LiCl-GaF_3$ | 3.43 |
| Preparation Example 2 | $3LiCl-GaF_3$ | 3.2 |
| Preparation Example 3 | $4LiCl-GaF_3$ | 1.79 |
| Preparation Example 4 | $3LiBr-GaF_3$ | 0.38 |
| Preparation Example 5 | $2LiCl-LiOH-GaF_3$ | 2.0 |
| Preparation Example 6 | $3LiCl-0.1LaCl_3-0.9GaF_3$ | 1.34 |
| Preparation Example 7 | $3LiCl-0.1InCl_3-0.9GaF_3$ | 2.32 |
| Preparation Example 8 | $3LiCl-GaF_3$ | 1.4 |

Referring to Table 3, the compounds of Preparation Examples 1 to 8 exhibited excellent conductivity. It was identified that there were great improvements ionic conductivity.

According to the disclosed embodiment, the composite solid electrolyte is arranged between a halide solid electrolyte and an oxide-based solid electrolyte, and thus, effectively inhibits a side reaction of the halide solid electrolyte and the oxide-based solid electrolyte, so that an electrochemical device, such as an electrochemical cell, having improved lifespan characteristics may be manufactured using the composite solid electrolyte.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite solid electrolyte comprising:
   a first solid electrolyte layer comprising a halide solid electrolyte;
   a second solid electrolyte layer comprising an oxide solid electrolyte; and a lithium ion-conductive interlayer between the first solid electrolyte layer and the second solid electrolyte layer, wherein the lithium ion-conductive interlayer comprises a composition in which a reaction energy of the lithium ion-conductive interlayer with respect to the first solid electrolyte is about −50 millielectronvolts per atom or greater, wherein the reaction energy of the lithium ion-conductive interlayer with respect to the first solid electrolyte is represented as Equation 1 (E1)

E1=(Thermodynamic energy of reaction product of the first solid electrolyte and the interlayer)−(Thermodynamic energy of the first solid electrolyte (reaction product 1)+Thermodynamic energy of the interlayer (reaction product 2))

wherein the thermodynamic energies are values obtained through density functional theory calculation.

2. The composite solid electrolyte of claim 1, wherein the lithium ion-conductive interlayer has an ionic conductivity of about $10^{-3}$ mS/cm or greater.

3. The composite solid electrolyte of claim 1, wherein the lithium ion-conductive interlayer comprises a lithium oxide comprising boron, carbon, or a combination thereof.

4. The composite solid electrolyte of claim 1, wherein the lithium ion-conductive interlayer comprises $Li_{2+x}C_{1-x}B_xO_3$ wherein $0<x<1$, LiF, $Li_2SO_4$, $Li_3AsO_4$, $Li_2CO_3$, $Li_3PO_4$, $LiPO_4$, LiCl, $Li_4VO_4F$, $Li_3VO_4$, $LiBO_2$, $Li_3BO_3$, $Li_2B_4O_7$, LiPON, or a combination thereof.

5. The composite of claim 4, wherein the lithium ion-conductive interlayer comprises lithium fluoride-doped lithium metaborate, silicon-doped lithium tetraborate, lithium metaborate-doped lithium carbonate, lithium orthoborate-doped lithium carbonate, lithium carbonate-doped lithium orthoborate, silicon dioxide-doped lithium orthoborate-lithium carbonate, lithium fluoride-doped lithium orthoborate-lithium carbonate, or a combination thereof.

6. The composite solid electrolyte of claim 1, wherein the lithium ion-conductive interlayer comprises a compound exhibiting peaks at diffraction angles of about 21° 2θ to about 22° 2θ, about 23° 2θ to about 24° 2θ, about 29.5° 2θ to about 30° 2θ, about 30.5° 2θ to about 31° 2θ, about 31.5° 2θ to about 32° 2θ, about 34° 2θ to about 34.5° 2θ, about 36° 2θ, about 37° 2θ, or about 39° 2θ to about 40° 2θ, when analyzed by X-ray diffraction analysis with Cu Kα radiation, or the lithium ion-conductive interlayer comprises a compound exhibiting peaks at diffraction angles of about 21° 2θ to about 22° 2θ, about 23° 2θ to about 24° 2θ, about 29.5° 2θ to about 30° 2θ, about 30.5° 2θ to about 31° 2θ, about 31.5° 2θ to about 32° 2θ, about 34° 2θ to about 34.5° 2θ, about 36° 2θ, about 37° 2θ, and about 39° 2θ to about 40° 2θ, when analyzed by X-ray diffraction analysis with Cu Kα radiation.

7. The composite solid electrolyte of claim 1, wherein the lithium ion-conductive interlayer comprises $Li_{2.1}C_{0.9}B_{0.1}O_3$, $Li_{2.15}C_{0.85}B_{0.15}O_3$, $Li_{2.175}C_{0.825}B_{0.175}O_3$, $Li_{2.2}C_{0.8}B_{0.2}O_3$, $Li_{2.5}C_{0.75}B_{0.25}O_3$, $Li_{2.275}C_{0.725}B_{0.275}O_3$, $Li_{2.3}C_{0.7}B_{0.3}O_3$, $Li_{2.5}C_{0.65}B_{0.35}O_3$, $Li_{2.375}C_{0.625}B_{0.375}O_3$, $Li_{2.4}C_{0.6}B_{0.4}O_3$, $Li_{2.45}C_{0.55}B_{0.45}O_3$, $Li_{2.475}C_{0.525}B_{0.475}O_3$, $Li_{2.5}C_{0.5}B_{0.5}O_3$, $Li_{2.55}C_{0.45}B_{0.55}O_3$, $Li_{2.575}C_{0.425}B_{0.575}O_3$, or a combination thereof.

8. The composite solid electrolyte of claim 1, wherein the lithium ion-conductive interlayer has a thickness of about 1 micrometers to about 10 micrometers.

9. The composite solid electrolyte of claim 1, wherein the halide solid electrolyte comprises a compound represented by Formula 1, and the compound represented by Formula 1 has a glass transition temperature of −30° C. or less and a glass or a glass-ceramic structure:

$ALi_qQ_{1-q}X$—$Ga_{1-z}MzF_{3-3z}Z_{3z}$  Formula 1 wherein, in Formula 1, Q is Na, K, or a combination thereof,

M is a trivalent cationic element, or a combination thereof,

X is a halogen element other than fluorine, a pseudohalogen, or a combination thereof, Z is a monovalent anionic element or a combination thereof, $1<A<5$, $0<q\leq1$, and $0\leq z<1$.

10. The composite solid electrolyte of claim 1, wherein the first solid electrolyte comprises a compound represented by Formula 2:

$ALiX$-$Ga_{1-z}M_zF_{3-3z}Z_{3z}$  Formula 2 wherein, in Formula 2,

M is a trivalent cationic element or a combination thereof,

X is a halogen element other than fluorine, or a combination thereof,

Z is a monovalent anion element or a combination thereof, $1<A<5$, and $0\leq z<1$.

11. The composite solid electrolyte of claim 1, wherein the first solid electrolyte comprises a compound represented by Formula 3:

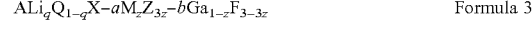
$ALi_qQ_{1-q}X$-$aM_zZ_{3z}$-$bGa_{1-z}F_{3-3z}$  Formula 3 wherein, in Formula 3, Q is Na, K, or a combination thereof,

M is a trivalent cationic element or a combination thereof,

X is a halogen element other than fluorine, or a combination thereof,

Z is a monovalent anion or a combination thereof, $0<a\leq1$, $0<b\leq1$, $0<a+b$, $a+b=4-A$, $1<A\leq3$, $0<q\leq1$, and $0\leq z<1$, with the proviso that a and b are not both 1.

12. The composite solid electrolyte of claim 1, wherein the first solid electrolyte comprises a compound represented by Formula 4:

$ALiX$-$aM_zZ_{3z}$-$bGa_{1-z}F_{3-3z}$  Formula 4 wherein, in Formula 4, M is a trivalent cationic element, or a combination thereof, X is a halogen element other than fluorine, or a combination thereof, Z is a monovalent anionic element, or a combination thereof, $0<a\leq1$, $0<b\leq1$, $0<a+b$, $a+b=4-A$, $1<A\leq3$, and $0\leq z<1$, with the proviso that a and b are not both 1.

13. The composite solid electrolyte of claim 9, wherein, in Formula 1,

M is In, Sc, Al, Tl, Y, B, La, or a combination thereof, and

Z is Cl, Br, I, SCN, OCN, CN, OH, $N_3$, or a combination thereof.

14. The composite solid electrolyte of claim 9, wherein, in Formula 1, X is Cl, Br, I, or a combination thereof, and Z is Cl, Br, I, SCN, OCN, CN, OH, $N_3$, or a combination thereof.

15. The composite solid electrolyte of claim 9,
wherein the compound of Formula 1 is one compound of Formulas 5 to 7:

$$ALiCl—GaF_3 \qquad \text{Formula 5}$$

wherein, in Formula 5, A is 2, 3, or 4, $$ALiBr—GaF_3 \qquad \text{Formula 6}$$

wherein, in Formula 6, A is 2, 3, or 4, $$ALiCl\text{-}aM_zZ_{3z}\text{-}bGaF_3 \qquad \text{Formula 7}$$

wherein, in Formula 7, A is 2 or 3,
Z is Cl or OH,
M is La, In, Sc, Al, Tl, Y, B, La, or a combination thereof,
$0<a<1$, $0<b<1$, $0<a+b$, $a+b=4-A$, and $0<z<1$.

16. The composite solid electrolyte of claim 9,
wherein, the compound of Formula 1 is $2LiCl$—$GaF_3$, $3LiCl$—$GaF_3$, $4LiCl$—$GaF_3$, $3LiBr$-$GaF_3$, $2LiCl$—$LiOH$—$GaF_3$, $3LiCl$-$0.1LaCl_3$-$0.9GaF_3$, $3LiCl$-$0.1InCl_3$-$0.9GaF_3$, $3LiCl$-$0.1ScCl_3$-$0.9GaF_3$, $3LiCl$-$0.1AlCl_3$-$0.9GaF_3$, $3LiCl$-$0.1TlCl_3$-$0.9GaF_3$, $3LiCl$-$0.1YCl_3$-$0.9GaF_3$, $3LiCl$-$0.1BCl_3$-$0.9GaF_3$, $2LiBr$—$GaF_3$, $4LiBr$—$GaF_3$, $2LiClO_4$-$GaF_3$, $2LiClO_4$-$LiOH$—$GaF_3$, $2LiCl$—$NaCl$—$GaF_3$, $3LiCl$—$NaCl$—$GaF_3$, $3LiCl$-$0.2LaCl_3$-$0.8GaF_3$, $3LiCl$-$0.2InCl_3$-$0.8GaF_3$, $3LiCl$-$0.3LaCl_3$-$0.7GaF_3$, $3LiCl$-$0.3InCl_3$-$0.7GaF_3$, $3LiCl$-$0.5LaCl_3$-$0.5GaF_3$, $3LiCl$-$0.5InCl_3$-$0.5GaF_3$, $3LiCl$-$0.2ScCl_3$-$0.8GaF_3$, $3LiCl$-$0.3ScCl_3$-$0.7GaF_3$, $3LiCl$-$0.5ScCl_3$-$0.5GaF_3$, $3LiCl$-$_{0.2}AlCl_3$-$0.8GaF_3$, $3LiCl$-$0.3AlCl_3$-$0.7GaF_3$, $3LiCl$-$0.5AlCl_3$-$0.5GaF_3$, $3LiCl$-$0.2BCl_3$-$0.8GaF_3$, $3LiCl$-$0.3BCl_3$-$0.7GaF_3$, $3LiCl$-$0.5BCl_3$-$0.5GaF_3$, $3LiCl$-$0.2TlCl_3$-$0.8GaF_3$, $3LiCl$-$0.3TlCl_3$-$0.7GaF_3$, $3LiCl$-$0.5TlCl_3$-$0.5GaF_3$, $3LiCl$-$0.2YCl_3$-$0.8GaF_3$, $3LiCl$-$0.3YCl_3$-$0.7GaF_3$, $3LiCl$-$0.5YCl_3$-$0.5GaF_3$, or a combination thereof.

17. The composite solid electrolyte of claim 9,
wherein the compound of Formula 1 exhibits a Cl 2p peak at about 199 eV to about 203 eV, when analyzed by X-ray photoelectron spectroscopy.

18. The composite solid electrolyte of claim 9,
wherein the compound of Formula 1 exhibits a primary peak at a diffraction angle of about 25° 2θ to about 35° 2θ, and a secondary peak at a diffraction angle of about 48° 2θ to about 65° 2θ, when analyzed by X-ray diffraction analysis with Cu Kα radiation.

19. The composite solid electrolyte of claim 9,
wherein the compound of Formula 1 exhibits peaks at a diffraction angles of about 29° 2θ to about 31° 2θ, about 33° 2θ to about 35° 2θ, and about 49° 2θ to about 51° 2θ, when analyzed by X-ray diffraction analysis with Cu Kα radiation, or
the compound of Formula 1 exhibits peaks at diffraction angles of about 29° 2θ to about 31° 2θ, about 33° 2θ to about 35° 2θ, about 59° 2θ to about 61° 2θ, and about 62° 2θ to about 64° 2θ, when analyzed by XRD analysis with Cu Kα radiation.

20. The composite solid electrolyte of claim 1,
wherein the oxide solid electrolyte is garnet ceramic of the formula $Li_{3+x}La_3M_2O_{12}$ wherein M is Te, Nb, or Zr, and x is an integer of 1 to 10, a lithium phosphorus oxynitride of the formula $Li_xPO_yN$, wherein $0<x<1$, $0<y<1$, and $0<z<1$, $Li_xP_yO_zN_K$ wherein $2.7≤x≤3.3$, $0.8≤y≤1.2$, $3.5≤z≤3.9$, and $0.1≤k≤0.5$), $Li_wPO_xN_yS_z$ wherein $0<w<1$, $0<x<1$, $0<y<1$, and $0<z<1$), $Li_{1+x+y}Al_xTi_{2-x}Si_yP_{3-y}O_{12}$ (wherein $0<x<2$ and $0≤y<3$, $BaTiO_3$, $Pb(Zr_aTi_{1-a})O_3$ $0≤a≤1$ (PZT), $Pb_{1-x}La_xZr_{1-y}Ti_yO_3$ wherein $0≤x<1$ and $0≤y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, a lithium phosphate $Li_3PO_4$, a lithium titanium phosphate of the formula $Li_xTi_y(PO_4)_3$ wherein $0<x<2$ and $0<y<3$, a lithium aluminum titanium phosphate of the formula $Li_xAl_yTi_z(PO_4)_3$ wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ wherein $0≤a≤1$, $0≤b≤1$, $0≤x≤1$ and $0≤y≤1$, a lithium lanthanum titanate of the formula $Li_xLa_yTiO_3$ wherein $0<x<2$ and $0<y<3$, a lithium germanium thiophosphate $Li_xGe_yP_zS_w$ wherein $0<x<4$, $0<y<1$, $0<z<1$, and $0<w<5$, a lithium nitride-based glass of the formula $Li_xN_y$, wherein $0<x<4$ and $0<y<2$, $Li_xSi_yS_z$ wherein $0<x<3$, $0<y<2$, and $0<z<4$), a $P_2S_5$ glass of the formula $Li_xP_yS_z$ wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, or a combination thereof.

21. The composite solid electrolyte of claim 9,
wherein a clay characteristic maintenance temperature of the compound of Formula 1 is about −60° C. to about 160° C.

22. The composite solid electrolyte of claim 9,
wherein the compound of Formula 1 has a glass-ceramic structure, and the glass-ceramic structure has ceramic content of 0.1 weight percent to 30 weight percent, based on a total weight of the compound of Formula 1.

23. An electrochemical device comprising the composite solid electrolyte of claim 1.

24. The electrochemical device of claim 23,
wherein the electrochemical device is a storage battery, a super capacitor, a fuel cell, a sensor, or a chromic device.

25. An electrochemical cell comprising the composite solid electrolyte of claim 1.

26. The electrochemical cell of claim 25,
wherein the electrochemical cell is a secondary battery comprising a cathode, an anode, and the composite solid electrolyte between the cathode and the anode.

27. The electrochemical cell of claim 26,
wherein the composite solid electrolyte comprises a compound represented by Formula 1, wherein the compound represented by Formula 1 has a glass or glass-ceramic structure:

$$ALi_qQ_{1-q}X—Ga_{1-z}M_zF_{3-3z}Z_{3z} \qquad \text{Formula 1}$$

wherein, in Formula 1, Q is Na, K, or a combination thereof,
M is a trivalent cationic element, or a combination thereof,
X is a halogen element other than fluorine, a pseudo-halogen, or a combination thereof,
Z is a monovalent anionic element or a combination thereof,
$1<A<5$, $0<q≤1$, and $0≤z<1$.

28. The electrochemical cell of claim 26,
wherein the anode comprises lithium metal or a lithium alloy.

29. A method of manufacturing an electrochemical cell, the method comprising:
providing a cathode;
providing an anode; and disposing the composite solid electrolyte of claim 1 between the cathode and the anode to manufacture the electrochemical cell.

\* \* \* \* \*